US011199147B2

United States Patent
Aso et al.

(10) Patent No.: US 11,199,147 B2
(45) Date of Patent: Dec. 14, 2021

(54) ENGINE CONTROL DEVICE AND NEURAL NETWORK PROGRAM PROVIDED THEREIN

(71) Applicant: TRANSTRON INC., Yokohama (JP)

(72) Inventors: Noriyasu Aso, Yokohama (JP); Masatoshi Ogawa, Yokohama (JP)

(73) Assignee: TRANSTRON INC., Yokohama (JP)

( * ) Notice: Subject to any disclaimer, the term of this patent is extended or adjusted under 35 U.S.C. 154(b) by 6 days.

(21) Appl. No.: 16/929,793

(22) Filed: Jul. 15, 2020

(65) Prior Publication Data

US 2021/0017923 A1    Jan. 21, 2021

(30) Foreign Application Priority Data

Jul. 17, 2019 (JP) .............................. JP2019-132053

(51) Int. Cl.
*F02D 41/14* (2006.01)
*G05B 13/02* (2006.01)
(Continued)

(52) U.S. Cl.
CPC ..... *F02D 41/1402* (2013.01); *F02D 41/1405* (2013.01); *G05B 13/027* (2013.01); (Continued)

(58) Field of Classification Search
CPC ............. F02D 41/1402; F02D 41/1405; F02D 2041/141; F02D 2041/1433; (Continued)

(56) References Cited

U.S. PATENT DOCUMENTS 5,247,445 A  *  9/1993  Miyano ............... F02D 41/1405
                                                            123/488
5,361,213 A  *  11/1994  Fujieda ................. B60W 50/00
                                                            701/111
(Continued)

FOREIGN PATENT DOCUMENTS

JP       2008-151118 A      7/2008
JP       2009-162231 A      7/2009
(Continued)

OTHER PUBLICATIONS

Extended European Search Report dated Dec. 14, 2020, issued in counterpart EP Application No. 20185927.9. (14 pages).
(Continued)

*Primary Examiner* — Sizo B Vilakazi
*Assistant Examiner* — Brian R Kirby
(74) *Attorney, Agent, or Firm* — Westerman, Hattori, Daniels & Adrian, LLP

(57) ABSTRACT

An engine control device includes an engine model having a neural network that inputs a manipulated variable of the engine and computes a controlled variable; and a controller that computes the manipulated variable so as to reduce a deviation between the controlled variable and a target controlled variable. The neural network includes an input layer to which the manipulated variable are input; a first hidden layer including a first fully connected layer; a second hidden later including a second fully connected layer that generates a plurality of second output values at a first time and has a return path on which the plurality of second output values at a second time, earlier than the first time, are input into the second fully connected layer; and an output layer from which the plurality of second output values at the first time are output as the controlled variable.

11 Claims, 18 Drawing Sheets

(51) Int. Cl.
*G05B 13/04* (2006.01)
*G06N 3/08* (2006.01)
*G06N 5/04* (2006.01)

(52) U.S. Cl.
CPC ........... *G05B 13/041* (2013.01); *G06N 3/084* (2013.01); *G06N 5/046* (2013.01); *F02D 2041/141* (2013.01); *F02D 2041/1433* (2013.01)

(58) Field of Classification Search
CPC ......... F02D 41/0065; F02D 2200/0406; F02D 41/0007; G05B 13/027; G05B 13/041; G06N 3/084; G06N 5/046; G06N 3/082; G06N 3/0481; G06N 3/0454; G06N 3/0445; Y02T 10/12; F02B 37/24
USPC ........ 706/12, 15, 23; 701/27, 40, 44, 59, 60, 701/77, 98, 101–115
See application file for complete search history.

(56) References Cited

U.S. PATENT DOCUMENTS

| | | | | |
|---|---|---|---|---|
| 5,682,317 | A * | 10/1997 | Keeler | G01N 33/0075 |
| | | | | 701/101 |
| 5,745,653 | A * | 4/1998 | Jesion | F02D 41/1405 |
| | | | | 706/23 |
| 5,752,007 | A * | 5/1998 | Morrison | G06N 3/08 |
| | | | | 703/2 |
| 5,806,013 | A * | 9/1998 | Paielli | F02D 41/1405 |
| | | | | 701/106 |
| 5,857,321 | A * | 1/1999 | Rajamani | F02C 9/28 |
| | | | | 60/39.27 |
| 5,915,368 | A | 6/1999 | Ishida et al. | |
| 6,092,017 | A * | 7/2000 | Ishida | F02D 41/1404 |
| | | | | 701/106 |
| 6,216,083 | B1 * | 4/2001 | Ulyanov | G05B 13/0285 |
| | | | | 701/106 |
| 6,405,122 | B1 * | 6/2002 | Yamaguchi | F02D 41/1404 |
| | | | | 701/106 |
| 6,687,597 | B2 * | 2/2004 | Sulatisky | F02D 19/0623 |
| | | | | 701/104 |
| 7,765,795 | B2 * | 8/2010 | Driscoll | F01N 3/206 |
| | | | | 60/285 |
| 8,301,356 | B2 * | 10/2012 | Wang | F02D 35/026 |
| | | | | 701/102 |
| 8,965,664 | B2 * | 2/2015 | Yasui | F02D 41/1402 |
| | | | | 701/106 |
| 10,947,919 | B1 * | 3/2021 | Charbonnel | F02D 41/0085 |
| 2001/0006004 | A1 * | 7/2001 | Zanetti | G01L 23/30 |
| | | | | 73/114.28 |
| 2008/0125929 | A1 | 5/2008 | Prokhorov | |
| 2010/0100248 | A1 | 4/2010 | Minto et al. | |
| 2020/0109678 | A1 * | 4/2020 | Nakamura | F02D 41/3005 |
| 2021/0017923 | A1 * | 1/2021 | Aso | G06N 3/082 |

FOREIGN PATENT DOCUMENTS

| | | |
|---|---|---|
| JP | 2010-76536 A | 4/2010 |
| JP | 2018-178810 A | 11/2018 |
| WO | 2018/179325 A1 | 10/2018 |

OTHER PUBLICATIONS

Yu-Jia Zhai et al., "Robust air/fuel ratio control with adaptive DRNN model and AD tuning", Engineering Applications of Artificial Intelligence, Pineridge Press, Swansea, GB, vol. 23, No. 2, Mar. 1, 2010, pp. 283-289; Cited Extended European Search Report dated Dec. 14, 2020. (7 pages).

Van Arsie et al., "Development and Real-Time Implementation of Recurrent Neural Networks for AFR Prediction and Control", SAE International Journal of Passenger Cars—Electronic and Electrical Systems, vol. 1, No. 1, Apr. 15, 2009, pp. 403-412; Cited Extended European Search Report dated Dec. 14, 2020. (10 pages).

Van Arsie et al., "A procedure to enhance identification of recurrent neural networks for simulating air-fuel ratio dynamics in SI engines", Engineering Applications of Artificial Intelligence, Pineridge Press, Swansea, GB, vol. 19, No. 1, Feb. 1, 2006, pp. 65-77; Cited Extended European Search Report dated Dec. 14, 2020. (13 pages).

I. Arsie et al., "Recurrent Neural Networks for Air-Fuel Ratio Estimation and Control in Spark-Ignited Engines", IFAC Workshop on Automatic Control in Offshore Oil and Gas Production, vol. 41, No. 2, Jan. 1, 2008, pp. 8508-8513; Cited Extended European Search Report dated Dec. 14, 2020. (6 pages).

* cited by examiner

FIG. 8
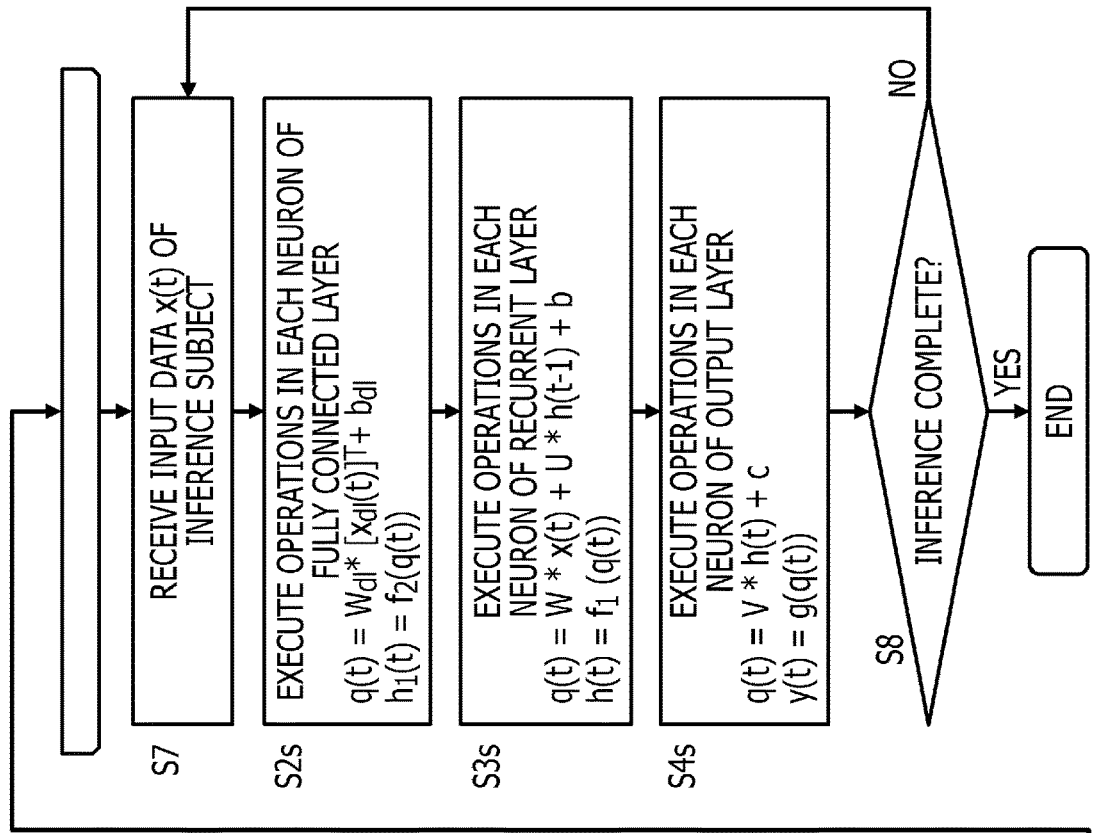
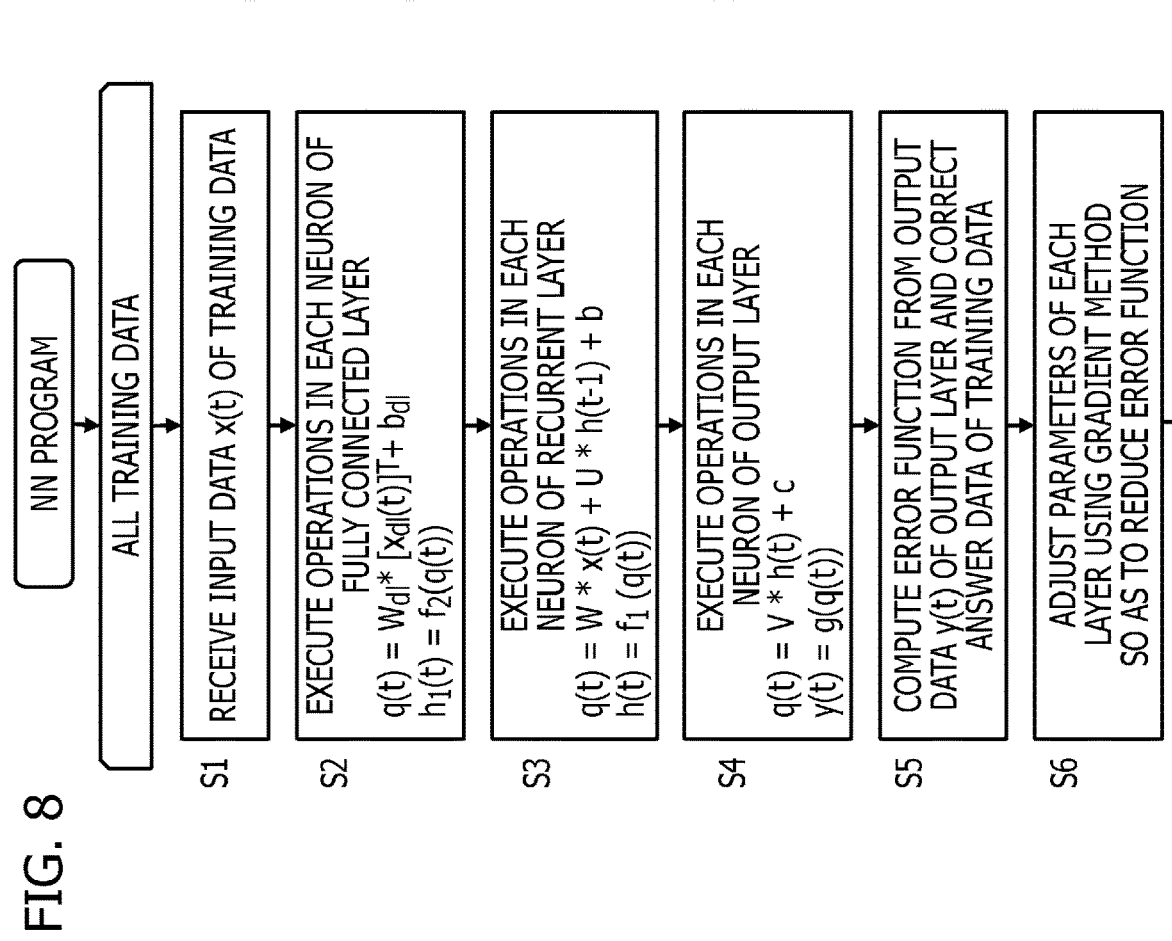

FIG. 18
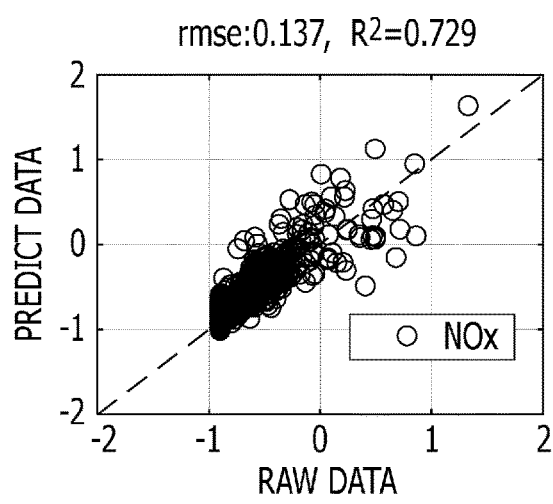
SECOND EXAMPLE
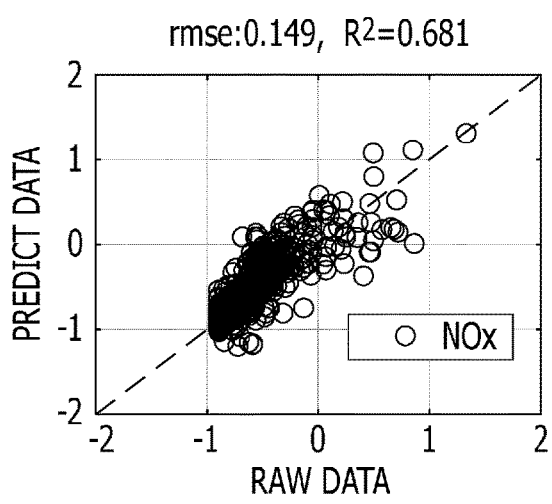
SECOND COMPARATIVE EXAMPLE
|  | SECOND EXAMPLE | SECOND COMPARATIVE EXAMPLE |
| --- | --- | --- |
| RMSE | 0.137 | 0.149 |
| $R^2$ | 0.729 | 0.681 |

ENGINE CONTROL DEVICE AND NEURAL NETWORK PROGRAM PROVIDED THEREIN

CROSS-REFERENCE TO RELATED APPLICATION

This application is based upon and claims the benefit of priority of the prior Japanese Patent Application No. 2019-132053, filed on Jul. 17, 2019, the entire contents of which are incorporated herein by reference.

FIELD

The present invention relates to an engine control device and a neural network program provided therein.

BACKGROUND

An engine control device includes a controller for computing a manipulated variable by which to bring a difference between a controlled variable and a target controlled variable of an engine close to zero, and an engine estimation unit for estimating the state of the engine. Instead of measuring the controlled variable of the engine, the engine estimation unit estimates the controlled variable of the engine and inputs the estimated controlled variable of the engine into the controller.

The engine estimation unit includes an engine model realized using a neural network, for example. The engine model receives the manipulated variable computed by the controller, data indicating the state of the engine, and so on, and estimates the controlled variable of the engine. The engine model realized by the neural network preforms a learning using training data including manipulated variables and controlled variables corresponding to thereto acquired by actually operating the engine. During the learning process, internal parameters of the neural network are adjusted so that the engine model can estimate the actual state of the engine.

Since the state of the engine that is a control subject at the current time is affected by past states, the engine model using the neural network receives time series data as the manipulated variable applied to the engine and the state data of the engine. Further, the neural network is a recurrent neural network having a return path that is suitable for time series data.

The engine model using the neural network is disclosed in the following prior arts.
Patent Literature 1: Japanese Laid-open Patent Publication No. 2008-151118
Patent Literature 2: WO 2018/179325
Patent Literature 3: Japanese Laid-open Patent Publication No. 2018-178810
Patent Literature 4: Japanese Laid-open Patent Publication No. 2009-162231
Patent Literature 5: Japanese Laid-open Patent Publication No. 2010-76536

SUMMARY

To improve the prediction precision of a model realized by a neural network, it is generally effective to increase the number of neurons or the number of layers. On the other hand, when the number of neurons or the number of layers is increased, the degree of freedom of the neural network increases, and therefore learning specific to training data is performed. This leads to a state of overlearning in which the reproducibility of the training data is high, and as a result, the generalization performance of the model decreases.

According to a first aspect of the present embodiment, an engine control device includes:
an engine model configured by a neural network that inputs a manipulated variable input into an engine and computes a controlled variable of the engine corresponding to the manipulated variable; and
a controller that computes the manipulated variable so as to reduce a deviation between the computed controlled variable and a target controlled variable, and outputs the computed manipulated variable to the engine, wherein
the neural network includes:
an input layer to which a plurality of input data including the manipulated variable are input;
a first hidden layer that includes a first fully connected layer having a plurality of first neurons that respectively generate first sums of products by adding together products of the plurality of input data and respective first weight parameters, and output a plurality of first output values by activating the respective first sums of products based on a first activation function;
a second hidden layer that includes a second fully connected layer having a plurality of second neurons that respectively generate second sums of products by adding together first products of the plurality of first output values acquired at a first time and respective second weight parameters and second products of a plurality of second output values acquired at a second time, which is earlier than the first time, and respective third weight parameters, and output the plurality of second output values acquired at the first time by activating the respective second sums of products based on a second activation function, and also includes a return path on which the plurality of second output values acquired at the second time are input into the second fully connected layer together with the first output values acquired at the first time; and
an output layer from which the plurality of second output values acquired at the first time are output as the controlled variable,
wherein the input data including the manipulated variable includes first time series data of any one of a turbine vane opening of a turbocharger of the engine, a valve opening of an exhaust gas recirculation device, and a throttle valve opening for controlling an amount of air supplied to an intake manifold, and
the plurality of second output values includes second time series data of any one of an amount of fresh air in the intake manifold of the engine, an intake air pressure in the intake manifold, and an amount of nitrogen oxide contained in exhaust gas.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a view depicting a flowchart of a neural network program according to the first embodiment.

FIG. 18 is a view illustrating the evaluation results of RMSE and R2 in the second example and the second comparative example.

DESCRIPTION OF EMBODIMENTS

Figure 1:
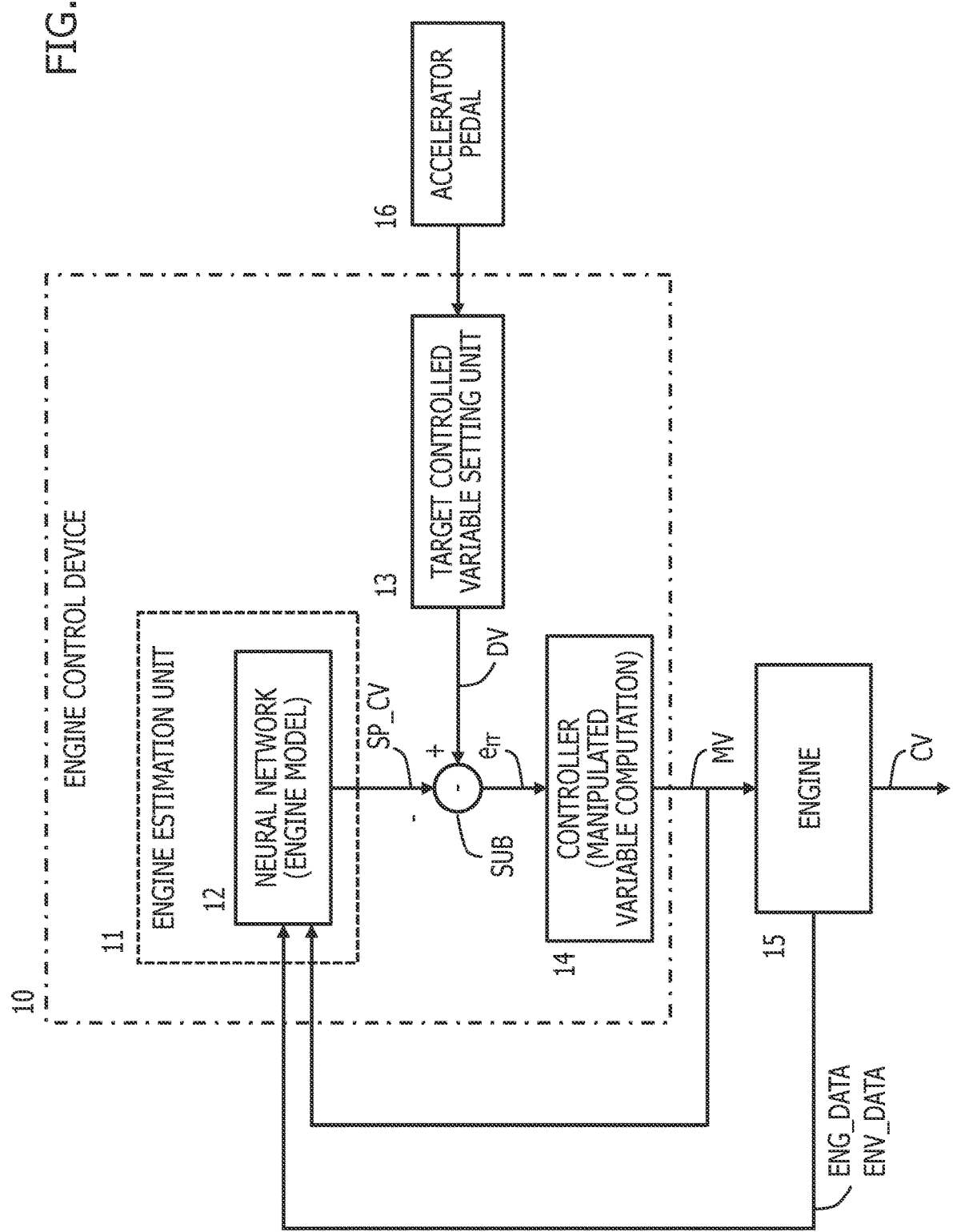
FIG. 1 is a view illustrating an example configuration of an engine control device according to this embodiment.

FIG. 1 is a view illustrating an example configuration of an engine control device according to this embodiment. An engine control device 10 computes a manipulated variable MV corresponding to a target controlled variable DV of an engine 15, inputs the manipulated variable MV into an internal actuator of the engine 15, and causes the actuator to execute a corresponding operation. The engine 15 operates based on the operation of the actuator so as to control a controlled variable CV of a control subject.

Since it is difficult or impossible to actually measure the controlled variable CV of the engine, the engine control device 10 includes an engine estimation unit 11. The engine estimation unit 11 includes an engine model 12 constituted by a neural network. The engine model 12 constituted by the neural network inputs the manipulated variable MV, computes a controlled variable of the control subject, and outputs an estimated controlled variable SP_CV. Data ENG_DATA indicating the internal state of the engine, external environment data ENV_DATA such as temperature and pressure, and so on may be input into the engine model 12 in addition to the manipulated variable MV.

A controller 14 then computes the manipulated variable MV by which to bring a difference err between the target controlled variable DV and the estimated controlled variable SP_CV, which is output by a subtractor SUB, close to zero. For example, the controller 14 computes the manipulated variable MV by PID control. A target controlled variable setting unit 13, for example, computes the target controlled variable DV based on an operation of an accelerator pedal 16 using a map function or the like.

In the embodiment to be described below, the controlled variable CV is any of a concentration of nitrogen oxide (NOx) (a NOx concentration), an amount of fresh air in an intake manifold, an intake air pressure in the intake manifold, and so on, for example. Further, the manipulated variable MV is any of a turbine vane opening of a turbocharger, a valve opening of an exhaust gas recirculation (EGR) device, and a throttle valve opening for controlling the amount of air supplied to the intake manifold, for example. Depending on the structure of the engine, the EGR valve opening may include a high-pressure EGR valve opening and a low-pressure EGR valve opening.

Time series data of the manipulated variable MV output by the controller 14 are input into the engine model 12 realized by the neural network. Time series data of the engine internal state data ENG_DATA and the external environment data ENV_DATA are also input into the engine model 12.

The state of the engine at the current time is affected by past states. As noted above, therefore, the manipulated variable MV, the engine internal state data ENG_DATA, and the external environment data ENV_DATA input into the neural network forming the engine model 12 are time series data. Further, the neural network is a recurrent neural network in which a hidden layer between the input layer and the output layer is provided with a return path. A past state generated by the hidden layer having the return path is returned (made recurrent) along the return path and input into the hidden layer having the return path together with the state at the current time. By including the return path, it is possible to construct an engine model that considers a feature of input data that vary over time.

Figure 2:
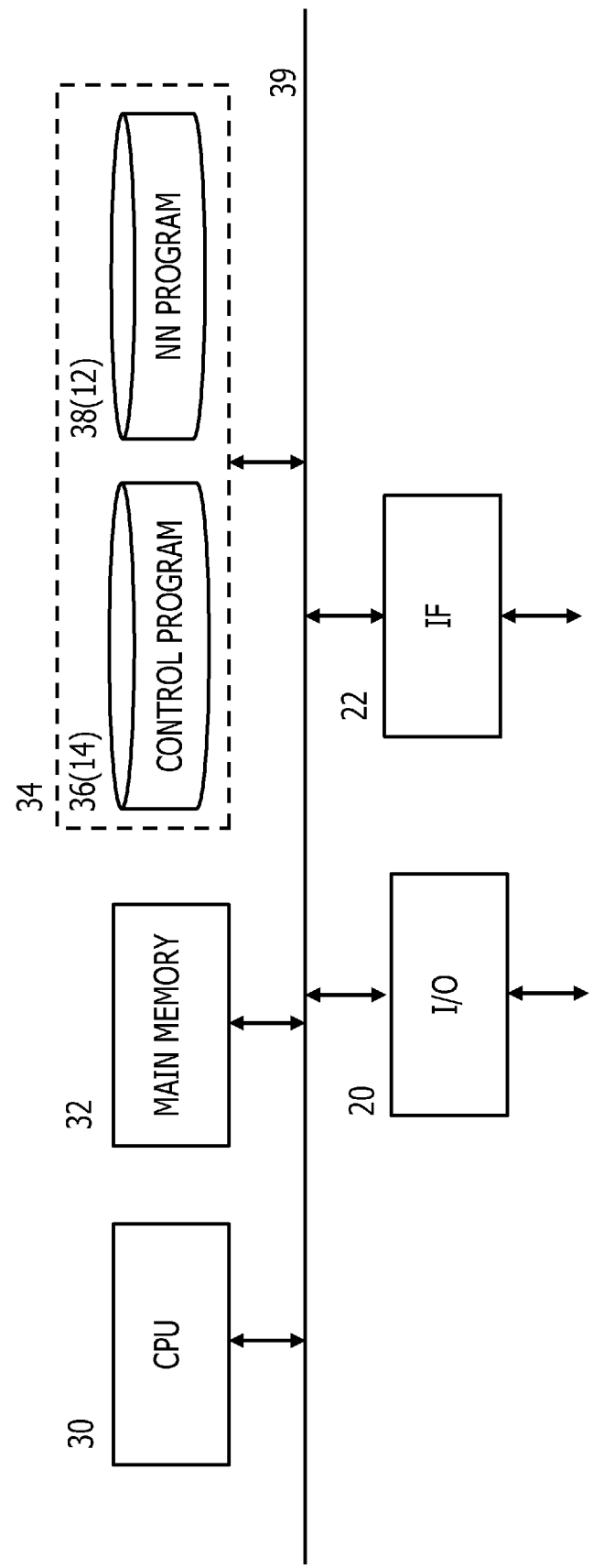
FIG. 2 illustrates an example hardware configuration of the engine control device according to this embodiment.

FIG. 2 illustrates an example hardware configuration of the engine control device according to this embodiment. The engine control device is an ECU (an electronic control unit) having a processor 30, a main memory 32 accessed by the processor, and storage 34, these components being configured to be capable of communicating via an internal bus 39. For example, the storage 34 stores a control program 36 for executing the operations of the PID control, for example, performed by the controller 14, and a neural network (NN) program 38 for executing the operations of the neural network 12. These programs 36, 38 are expanded in the main memory 32 and executed by the processor 30.

The engine control device further includes an input/output unit 20 that receives input data and outputs output data, and a network interface 22 for controlling communication with another ECU connected via a network.

Figure 3:
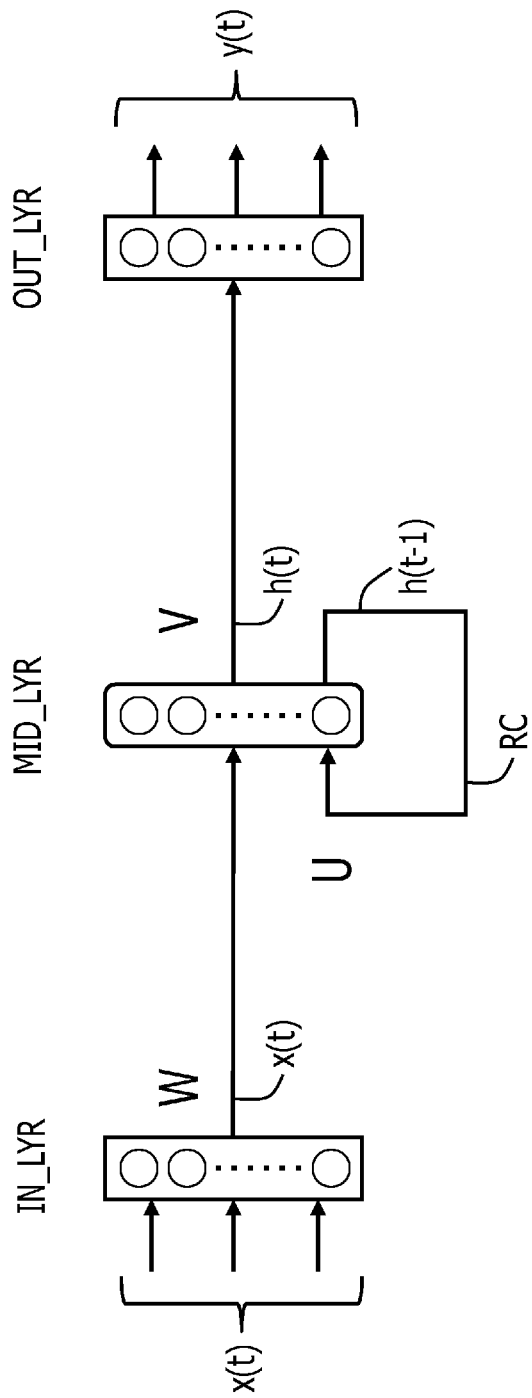
FIG. 3 is a view illustrating an example configuration of a typical recurrent neural network.

FIG. 3 is a view illustrating an example configuration of a recurrent neural network. The recurrent neural network includes an input layer IN_LYR on which input data x(t) are input, an output layer OUT_LYR on which output data y(t) are output, and a hidden layer MID_LYR that is provided between the input layer and the output layer and includes a return path RC. Each neuron of the hidden layer MID_LYR computes a sum of products by adding together products of the input data x(t) from the input layer and a weight W. Further, each neuron outputs a value h(t) acquired by activating the sum of products using an activation function (not depicted). A bias b may be provided as a parameter in addition to the weight W.

The return path RC provided in the hidden layer MID_LYR returns an output h(t−1) of the hidden layer to the input side of the hidden layer. Each neuron of the hidden layer computes a sum of products by adding together products of the recurrent input h(t−1) and a weight U, as the input x(t) from the input layer. Further, each neuron outputs the value h(t) acquired by activating the sum of products using the activation function. The recurrent input h(t−1) returned from the output of the hidden layer is a past output h(t−1) generated from an input x(t−1) received by the hidden layer from the input layer at a past time t−1 and a recurrent output h(1-2) acquired at a time t−2 further in the past. As will be described below, the hidden layer MID_LYR and the output layer OUT_LYR are fully connected layers, for example.

The operations performed by each neuron on the layer of the hidden layers MID_LYR that includes the return path are as follows.

$$q(t) = W*x(t) + U*h(t-1) + b \quad (1)$$

$$h(t) = f(q(t)) \quad (2)$$

Here, x(t), q(t), and h(t) are signal vectors, W and U are weight vectors, b is a bias vector, and f is the activation function of the hidden layer.

Further, the operations performed by each neuron on the output layer OUT_LYR are as follows.

$$q(t) = V*h(t) + c \quad (3)$$

$$y(t) = g(q(t)) \quad (4)$$

Here, q(t) and y(t) are signal vectors, V is a weight vector, c is a bias vector, and g is the activation function of the output layer.

As noted above, by providing the neural network with a return path, it is possible to construct an engine model that considers a feature of input data that vary over time. A fully connected layer having a return path extracts a feature that is based on states at the current time t and past times t−1, t−2, . . . .

In a model realized by a neural network, the prediction precision of the model can generally be improved by increasing the number of neurons or the number of layers in the hidden layers of the network. However, when the number of neurons is increased, the degree of freedom of the network increases such that overlearning occurs during the learning process, leading to a reduction in the generalization performance by which an output can be computed with a high degree of precision in relation to unknown data other than learning data. In the embodiments described below, a reduction in the generalization performance is suppressed.

First Embodiment

According to knowledge of the present inventors, when a fully connected layer is provided in a neural network between the input layer and a layer having a return path, it is possible to improve the prediction precision of the model and suppress a reduction in the generalization performance without increasing the number of neurons or the number of layers in the hidden layers, which include the layer having the return path.

Figure 4:
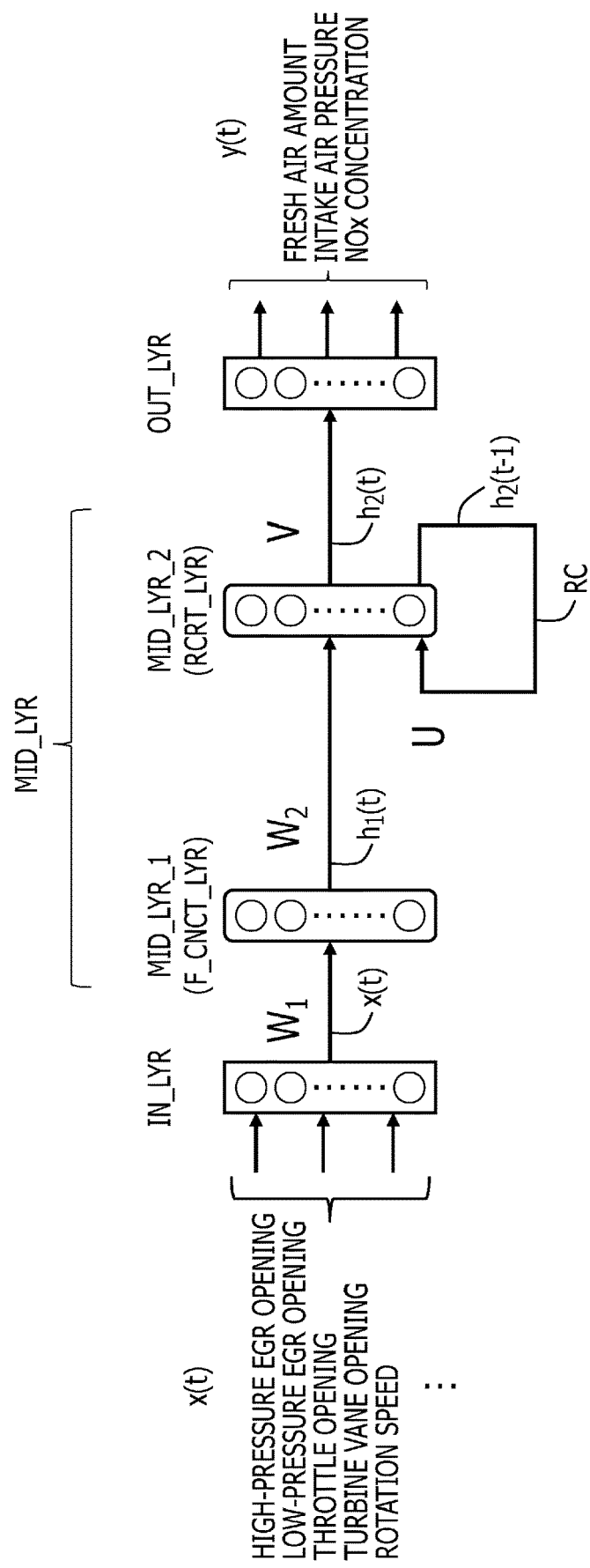
FIG. 4 is a view illustrating an example configuration of a neural network according to a first embodiment.

FIG. 4 is a view illustrating an example configuration of a neural network according to a first embodiment. The neural network of FIG. 4 includes an input layer IN_LYR to which input data x(t) are input, an output layer OUT_LYR from which output data y(t) are output, and hidden layers MID_LYR between the input layer and the output layer. The hidden layers MID_LYR include a first hidden layer MID_LYR_1 including a fully connected layer F_CNCT_LYR, and a second hidden layer MID_LYR_2 including a layer RCRT_LYR having a return path. In other words, on the neural network, the fully connected layer F_CNCT_LYR is provided between the input layer IN_LYR and the layer RCRT_LYR having the return path.

The layer RCRT_LYR having the return path is as illustrated in FIG. 3. The fully connected layer F_CNCT_LYR, meanwhile, generates a sum of products by multiplying the inputs x(t) from the input layer by a weight W1 and summing the products, and outputs a value $h_1(t)$ acquired by activating the sum of products using an activation function (not depicted). The bias b may be provided in addition to the weight W1.

The neural network according to the first embodiment is a model of a gasoline or diesel engine, for example. The input data x(t) input into the input layer include at least one of the high-pressure EGR opening, the low-pressure EGR opening, the throttle opening, and the turbine vane opening, which are the manipulated variable MV. The input data x(t) may also include the engine internal state data ENG_DATA, such as the engine rotation speed, and the external environment data ENV_DATA, such as the external temperature or pressure.

The output data y(t) output from the output layer include at least one of the fresh air amount, the intake air pressure, and the NOx concentration of the exhaust gas, which are the controlled variable CV. The input data x(t) and the output data y(t) are both time series data.

Figure 5:
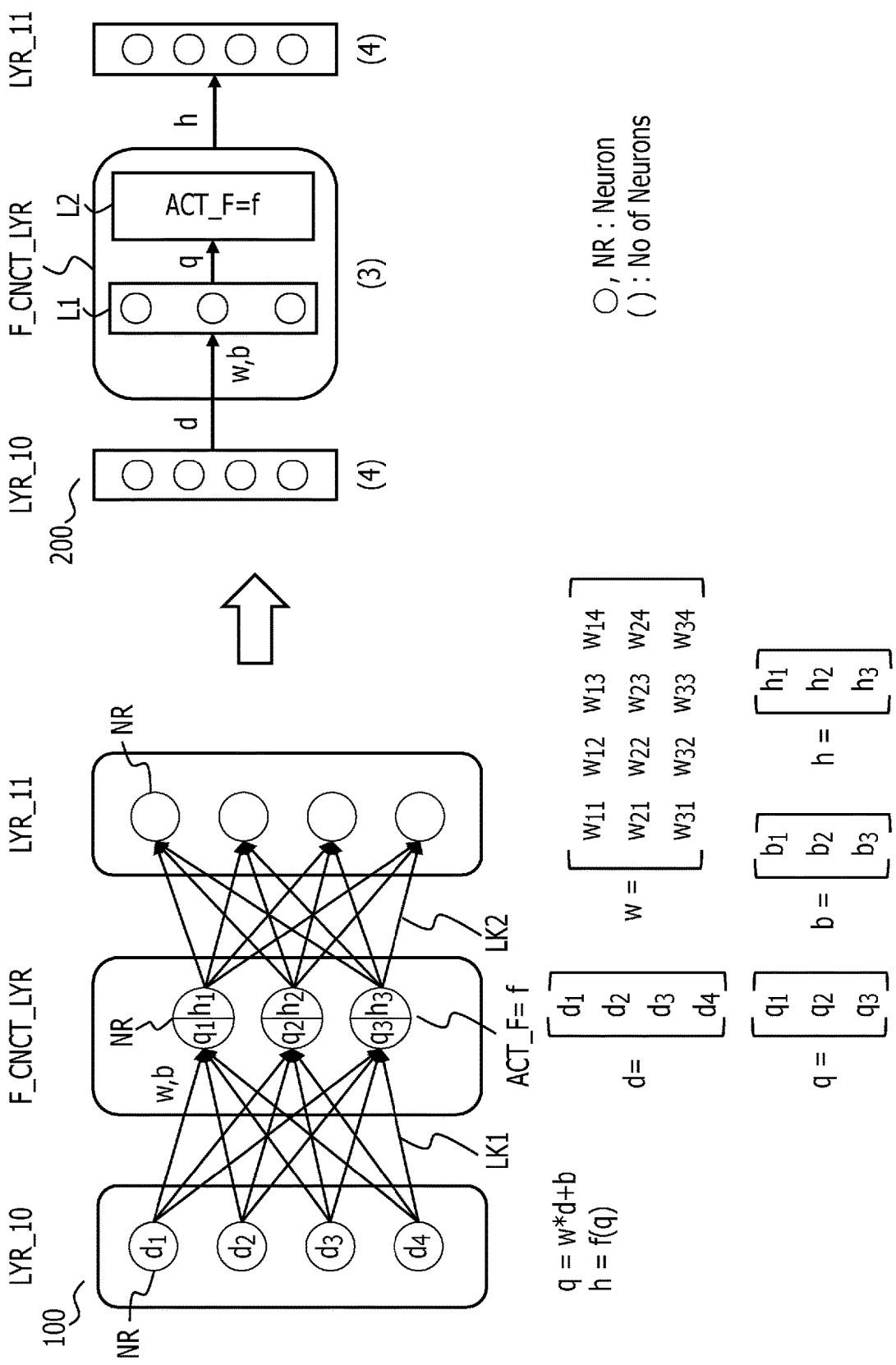
FIG. 5 is a view illustrating an example configuration of a fully connected layer.

FIG. 5 is a view illustrating an example configuration of a fully connected layer. A network 100 illustrated on the left side of FIG. 5 includes a fully connected layer F_CNCT_LYR, a preceding layer LYR_10, and a following layer LYR_11. The preceding layer LYR_10 has four neurons NR, for example, and the neurons NR respectively output elements $d_1$ to $d_4$ of data d to the neurons NR of the fully connected layer F_CNCT_LYR.

The operations performed in the fully connected layer are as follows.

$$q = w*d + b \quad (5)$$

$$h = f(q) \quad (6)$$

Here, data d, q, h are 4-row or 3-row vectors having elements corresponding to the numbers of neurons on the respective layers, the weight w is a 3-row, 4-column vector, and the bias b is a 3-row vector.

The respective vectors are as illustrated in the figure and as indicated below.

$$d = \begin{bmatrix} d_1 \\ d_2 \\ d_3 \\ d_4 \end{bmatrix} \quad w = \begin{bmatrix} w_{11} & w_{12} & w_{13} & w_{14} \\ w_{21} & w_{22} & w_{23} & w_{24} \\ w_{31} & w_{32} & w_{33} & w_{34} \end{bmatrix} \quad \text{Formula 1}$$

$$q = \begin{bmatrix} q_1 \\ q_2 \\ q_3 \end{bmatrix} \quad b = \begin{bmatrix} b_1 \\ b_2 \\ b_3 \end{bmatrix} \quad h = \begin{bmatrix} h_1 \\ h_2 \\ h_3 \end{bmatrix}$$

In expression (5) above, the uppermost neuron NR, for example, of the fully connected layer F_CNCT_LYR generates data $q_1$ by adding a bias $b_1$ to a sum of products w*d acquired by adding together four products of each of the data $d_1$ to $d_4$ of the 4 neurons NR of the preceding layer LYR_10 and weights $w_{11}$ to $w_{14}$.

Further, in expression (6) above, the uppermost neuron NR of the fully connected layer outputs output data $h_1$ by subjecting the data $q_1$ computed using expression (5) to non-linear or linear conversion using the activation function f.

In a similar manner, the other two neurons of the fully connected layer F_CNCT_LYR compute data $q_2$, $q_3$ in accordance with expression (5), convert the data $q_2$, $q_3$ using the activation function f in accordance with expression (6), and output data $h_2$, $h_3$. In other words, the above operations are performed based on weights w and biases b associated with links LK1 between the neurons NR on the fully connected layer F_CNCT_LYR and the 4 neurons NR of the preceding layer LYR_10.

The output data $h_1$ to $h_3$ of the fully connected layer are associated with all of the neurons NR of the following layer LYR_11 by links LK2, whereupon each neuron of the following layer performs similar operations to the fully connected layer. The operations performed on the following layer will not be described.

During a learning process, a fully connected layer provided in a neural network performs the above operations on input data of training data. Parameters such as the weight and the bias are then adjusted so as to minimize an error between the output data computed on the output layer and the correct answer data of the training data. Hence, the fully connected layer has a function for extracting a feature of the input data for minimizing the error.

Notation indicating that the fully connected layer F_CNCT_LYR has been simplified is depicted on a network 200 illustrated on the right side of FIG. 5. The notation depicted on the fully connected layer F_CNCT_LYR includes a first layer L1 corresponding to the operations of expression (5) above, and a second layer L2 corresponding to the operations of expression (6). Hereafter, in this specification, the fully connected layer F_CNCT_LYR will be depicted using this notation.

Figure 6:
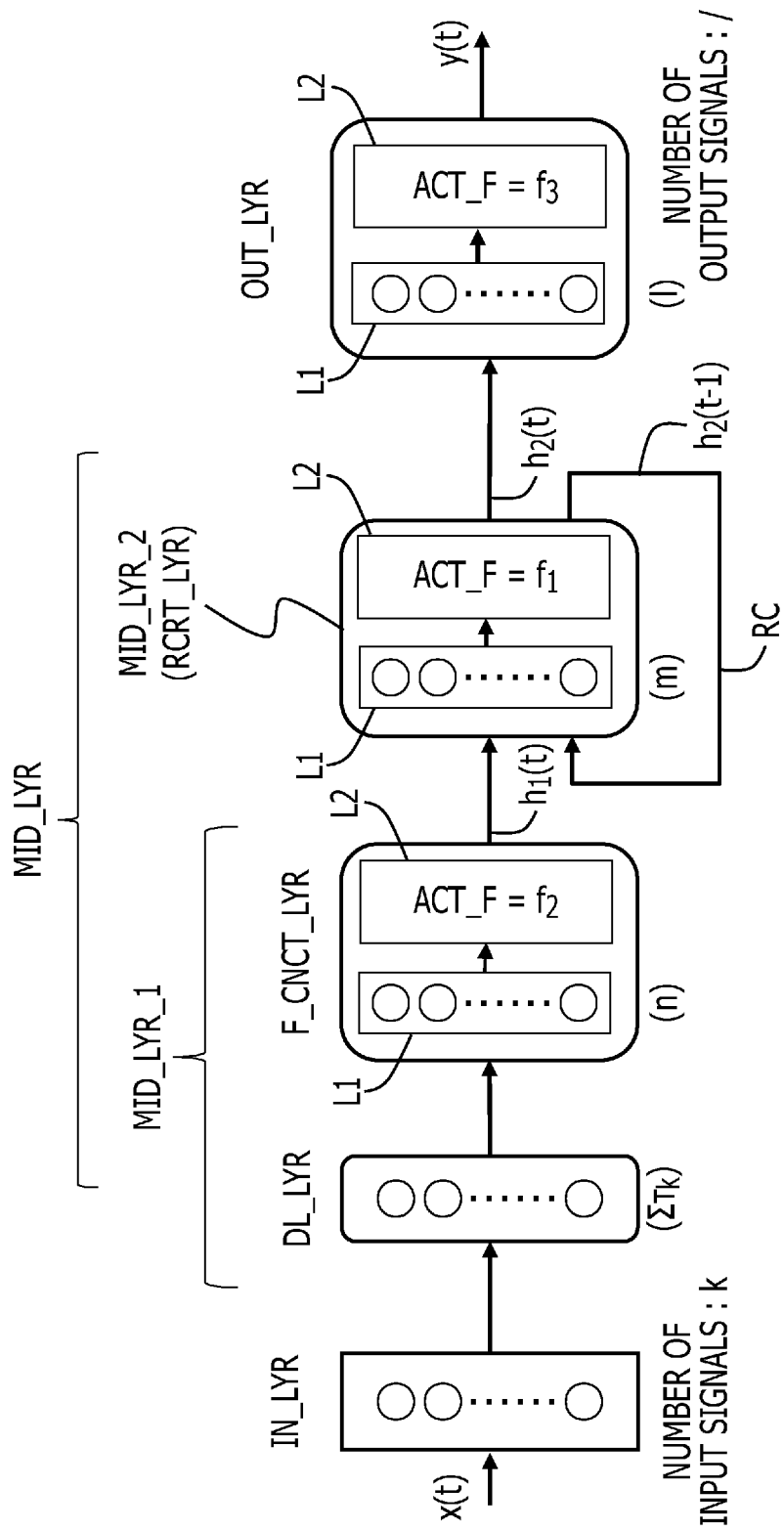
FIG. 6 is a view illustrating the configuration of the neural network according to the first embodiment.

FIG. 6 is a view illustrating the configuration of the neural network according to the first embodiment. On the neural network illustrated in FIG. 6, the fully connected layer, the layer having the return path, and the output layer of the neural network illustrated in FIG. 4 are depicted using the notation of the fully connected layer of FIG. 5.

Accordingly, the neural network of FIG. 6, similarly to the neural network of FIG. 4, includes the input layer IN_LYR to which the input data x(t) are input, the output layer OUT_LYR from which the output data y(t) are output, and the hidden layers MID_LYR between the input layer and the output layer. Further, the hidden layers MID_LYR include the first hidden layer MID_LYR_1 including the fully connected layer F_CNCT_LYR, and the second hidden layer MID_LYR_2 including the layer RCRT_LYR having the return path.

Note, however, that in contrast to FIG. 4, the first hidden layer MID_LYR_1 includes a delay layer DL_LYR that considers time delays for time series data. The delay layer DL_LYR inputs time series data including the data x(t) of the input data x(t) input into the input layer IN_LYR at the current time t and τ−1 sets of past data x(t-dt) to x(t−(r−1)*dt) acquired at intervals of a sampling period dt.

The fully connected layer F_CNCT_LYR is illustrated using the notation of FIG. 5, and the activation function ACT_F thereof is a rectified linear unit (ReLU) $f_2$. As denoted by the function expression in FIG. 6, the output of the rectified linear unit $f_2$ is 0 when the input x is 0 or less, and x when the input x is positive. By employing this rectified linear unit $f_2$ as the activation function, the output of the first hidden layer MID_LYR_1 is 0 when the sum of products (W*x+b) of the inputs, the weight and the bias is 0 or less, and as a result, unnecessary features are removed.

Hence, when a fully connected layer in which the activation function is a rectified linear unit ReLU, for example, is provided between the input layer and the layer having the return path, some of the plurality of data $q_1$ to $q_n$ computed respectively by the plurality of neurons on the fully connected layer become data "0", and therefore unnecessary information (data "0") is removed from the high-order (n-order) information of the input signals so that the input signals are compressed into low-order information. Thus, the fully connected layer can extract a feature of the input signals and output the compressed data to the layer having the return path.

As a result, the neural network can compute output data having a small error by processing low-order information without increasing the number of neurons on the layer having the return path or the number of layers of the layer having the return path. Moreover, since the numbers of neurons and layers on the layer having the return path are small, the degree of freedom of the network is reduced, and therefore a reduction in the generalization performance of the neural network due to overlearning can be suppressed.

To put it in other words, a part of the output data of the fully connected layer is removed as 0 so that some of the neurons of the fully connected layer enter a state resembling a disabled state, and as a result, an effect similar to that achieved by ensemble learning can be expected.

The activation function of the fully connected layer may be a function having similar characteristics to the aforementioned rectified linear unit ReLU. As long as the function has similar characteristics, the number of degrees of the output data of the fully connected layer can be reduced, and therefore similar effects can be expected.

The layer RCRT_LYR having the return path on the second hidden layer MID_LYR_2 provided on the neural network of FIG. 6 is configured such that the return path RC is provided in a fully connected layer having first and second layers L1 and L2. The activation function ACT_F=$f_1$ of the second layer L2 is a hyperbolic tangent function tan h, for example. On the layer having the return path, the output data of the past time t−1, $h_2(t-1)$, is returned to the input in addition to the input data of the current time t, $h_1(t)$, and therefore both the number of neurons and the computation load of the fully connected layer having the return path are larger than those of a fully connected layer without the return path. According to this embodiment, however, the numbers of neurons and layers on the layer RCRT_LYR having the return path are small, and therefore the computation load does not increase dramatically.

The output layer OUT_LYR of the neural network illustrated in FIG. 6 is a fully connected layer including first and second layers L1 and L2 and having an identical number of neurons to the number of signals I of the output signals y(x). The activation function ACT_F of each neuron is a linear function $f_3$=g(x)=x. Accordingly, on the output layer, the second layer L2 outputs the sum of products computed by the first layer L1 using the weight and the bias as Is.

Figure 7:
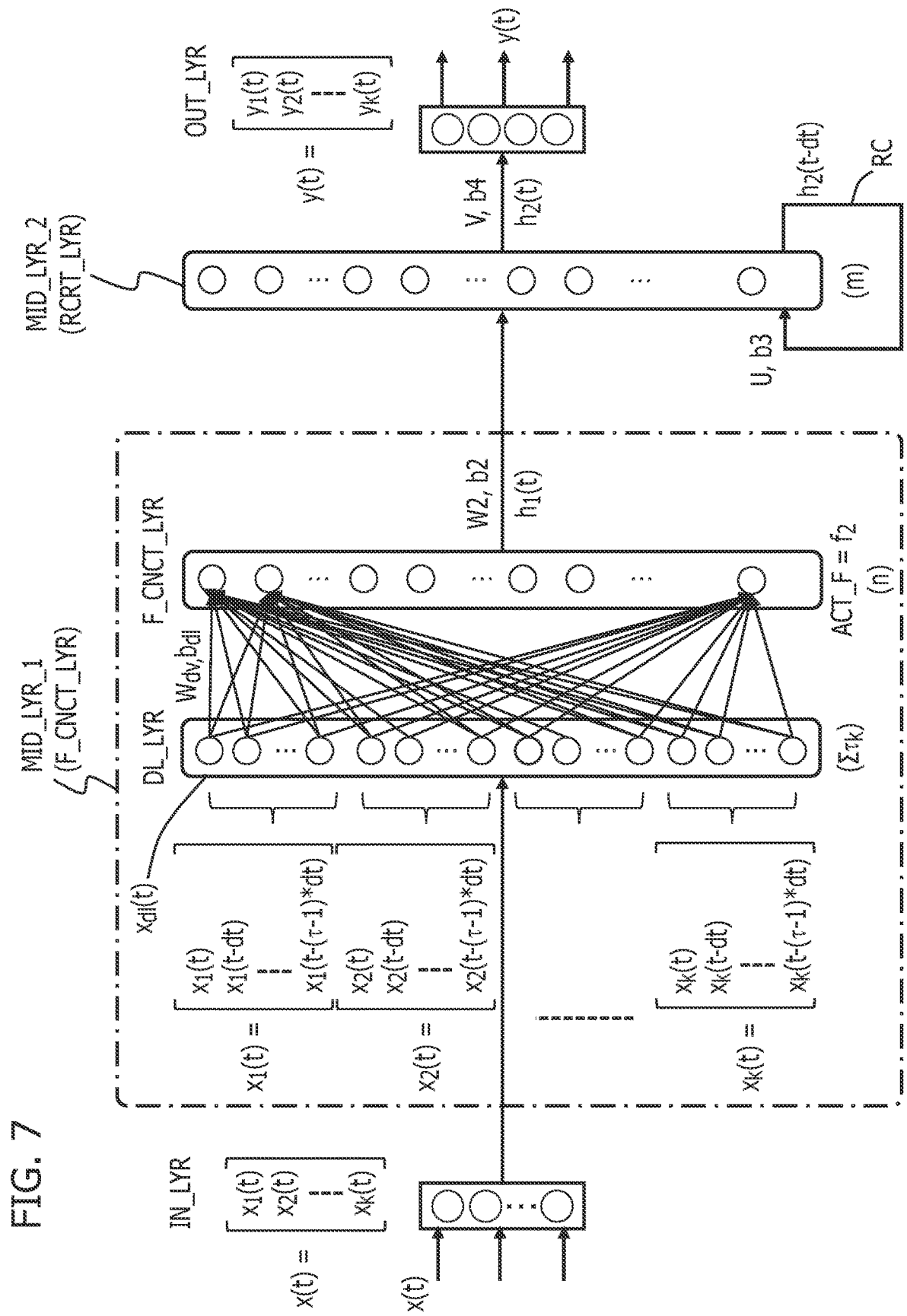
FIG. 7 is a view illustrating in detail the configurations of the delay layer DL_LYR and the fully connected layer F_CNCT_LYR within the first hidden layer MID_LYR_1 of the neural network of FIG. 6.

FIG. 7 is a view illustrating in detail the configurations of the delay layer DL_LYR and the fully connected layer F_CNCT_LYR within the first hidden layer MID_LYR_1 of the neural network of FIG. 6. As noted above with reference to FIG. 6, the delay layer DL_LYR receives the time series data of each of k sets of input data x(t)=$x_1(t)$ to $x_k(t)$ from the input layer IN_LYR. The time series data are illustrated by the following determinant.

$$x(t) = \begin{bmatrix} x_1(t) \\ x_2(t) \\ \vdots \\ x_k(t) \end{bmatrix} = \begin{bmatrix} x_1(t) & x_1(t-dt) & \ldots & x_1(t-(\tau-1)*dt) \\ x_2(t) & x_2(t-dt) & \ldots & x_2(t-(\tau-1)*dt) \\ \vdots & \vdots & & \vdots \\ x_k(t) & x_k(t-dt) & \ldots & x_k(t-(\tau-1)*dt) \end{bmatrix} \quad \text{Formula 2}$$

According to formula 2, the first set of input data $x_1(t)$ of the input data $x(t)$ are time series data including the data $x_1(t)$ of the current time t and $\tau-1$ sets of consecutive past data $x_1(t-dt)$ to $x_1(t-(\tau-1)*dt)$ acquired at intervals of the sampling period dt. The other sets of input data $x_2(t)$ to $x_k(t)$ are similar.

In the control subject engine, the controlled variable CV and the state data ENG_DATA of the engine vary at a delay relative to change in the manipulated variable MV. In response to this delay relative to the input signal, the input $x(t)$ at the current time t is set so that of the time series data acquired at intervals of the sampling period dt, the signal $x(t)$ acquired at the current time t and the $\tau-1$ signals $x(t-dt)$ to $x(t-(\tau-1)*dt)$ acquired at the past times t-dt to $t-(\tau-1)*dt$ can be taken into account.

The input data $x(t)=x_1(t)$ to $x_k(t)$ illustrated in formula 2 are input into the respective neurons of the delay layer DL_LYR sequentially, and as a result, the following data $x_{d1}(t)$ of formula 3 are acquired.

$$x_{dl}(t) = \begin{bmatrix} x_1(t) \\ x_1(t-dt) \\ \vdots \\ x_1(t-(\tau-1)*dt) \\ x_2(t) \\ x_2(t-dt) \\ \vdots \\ x_2(t-(\tau-1)*dt) \\ \vdots \\ x_k(t) \\ x_k(t-dt) \\ \vdots \\ x_k(t-(\tau-1)*dt) \end{bmatrix} \quad \text{Formula 3}$$

$$W_{dl} = \begin{bmatrix} w_{dl\_11} \\ w_{dl\_12} \\ \vdots \\ w_{dl\_1\tau} \\ w_{dl\_21} \\ w_{dl\_22} \\ \vdots \\ w_{dl\_2\tau} \\ \vdots \\ w_{dl\_k1} \\ w_{dl\_k2} \\ \vdots \\ w_{dl\_k\tau} \end{bmatrix} \quad b_{dl} = \begin{bmatrix} b_{dl\_11} \\ b_{dl\_12} \\ \vdots \\ b_{dl\_1\tau} \\ b_{dl\_21} \\ b_{dl\_22} \\ \vdots \\ b_{dl\_2\tau} \\ \vdots \\ b_{dl\_k1} \\ b_{dl\_k2} \\ \vdots \\ b_{dl\_k\tau} \end{bmatrix}$$

The above formula also illustrates the weight $W_{d1}$ and the bias $b_{d1}$ of the fully connected layer F_CNCT_LYR in relation to the output data $x_{d1}(t)$ of the delay layer DL_LYR.

In accordance with the number of signals k and the $\tau$ sets of time series data for the signals, the number of elements on the weight and bias vectors is $\tau\tau_k=\tau_1+\tau_2+\ldots+\tau_k$. When every $\tau_i$ is identical, the number of elements is $\tau*k$.

Each neuron of the fully connected layer F_CNCT_LYR performs the following operations using expressions (5) and (6), illustrated above.

$$q(t)=W_{d1}*[x_{d1}(t)]^T+b_{d1} \quad (5')$$

$$h_1(t)=f_2(q(t)) \quad (6')$$

Further, each neuron of the layer RCRT_LYR having the return path within the second hidden layer MID_LYR_2 performs the following operations using expressions (1) and (2), illustrated above.

$$q(t)=W_2*h_1(t)+b_2+U*h_2(t-dt)+b_3 \quad (1')$$

$$h_2(t)=f_1(q(t)) \quad (2')$$

Furthermore, each neuron of the output layer OUT_LYR performs the following operations using expressions (3) and (4), illustrated above.

$$q(t)=V*h_2(t)+b_4 \quad (3')$$

$$y(t)=f_3(q(t)) \quad (4')$$

On the fully connected layer F_CNCT_LYR provided in the first hidden layer MID_LYR_1 illustrated in FIG. 7, feature time series data $h_1(t)$ are extracted from the k sets of input data $x_1(t)$ to $x_k(t)$, which are constituted by $\tau$ sets of time series data acquired at intervals of the sampling period dt. The time series data $h_1(t)$, the data amount of which has been compressed, are then input into the layer RCRT_LYR having the return path. As a result, the prediction precision of the model can be improved and a reduction in the generalization performance can be suppressed without increasing the number of neurons or the number of layers on the layer having the return path.

The time series input data $x_1(t)$ to $x_k(t)$ may have different optimum numbers of steps $\tau$ to be taken into consideration. Therefore, the respective numbers of steps $\tau_k$ of the time series input data $x_1(t)$ to $x_k(t)$ may be set at different numbers. In this case, the number of neurons on the delay layer DL_LYR is set at $\tau\tau_i$. $\tau\tau_i$ is the cumulative number of $\tau_1$ to $\tau_k$. Further, the number of neurons on the fully connected layer F_CNCT_LYR of the first hidden layer MID_LYR_1 may either be set likewise at $\Sigma\tau_i$ or at any other desired number n.

FIG. 8 is a view depicting a flowchart of a neural network program according to the first embodiment. The processor 30 of the engine control device illustrated in FIG. 2 executes the neural network program 38 to perform the operations of a neural network 12 that is the engine model illustrated in FIG. 1. These operations are as described below.

The operations executed by the processor 30 include operations of a learning process and operations of an inference process. In the learning process, the processor executes processing steps S1 to S6 on all training data. More specifically, first, the processor receives the input data x(t) of the training data (S1). As a result, the plurality of time series input data $x_1(t)$ to $x_k(t)$ are input into the delay layer DL_LYR from the input layer IN_LYR.

Next, the processor executes operations in each neuron of the fully connected layer F_CNCT_LYR (S2). The arithmetic expressions in this case are expressions (5') and (6'), illustrated above. Further, the processor executes operations in each neuron of the layer RCRT_LYR having the return path (S3). The arithmetic expressions in this case are expressions (1') and (2'), illustrated above. Furthermore, the processor executes operations in each neuron of the output layer OUT_LYR (S4). The arithmetic expressions in this case are expressions (3') and (4'), illustrated above. The above processing corresponds to feedforward processing.

The processor then computes an error function from the output data of the output layer and the correct answer data of the training data (S5), and using a gradient method, for example, adjusts the parameters, weights w, and biases b, c of each layer so as to reduce the error function (S6). The parameters of a recurrent neural network that handles time series data are adjusted using a method of error backpropagation through time. Once learning has been completed in relation to all of the training data, the processing advances to the inference process.

The parameter adjustment operation S6 may be a processing to backpropagate the error between the output data of the output layer and the correct answer data of the training data and update the parameters to new parameters using a gradient method. When the processing steps S1 to S6 have been performed on all of the training data, the operations of the learning process are complete.

In the inference process, the processor inputs input data x(t) for the inference and inputs the plurality of time series input data $x_1(t)$ to $x_k(t)$ into the delay layer DL_LYR (S7). The processor then executes operations in the respective neurons of the fully connected layer F_CNCT_LYR (S2s), executes operations in each neuron of the layer having the return path (S3s), and executes operations in each neuron of the output layer OUT_LYR (S4s). These operations S2s, S3s, S4s are identical to the operations S2, S3, S4 performed during the learning process. The inference operations described above are repeated until inference is complete.

Second Embodiment

Figure 9:
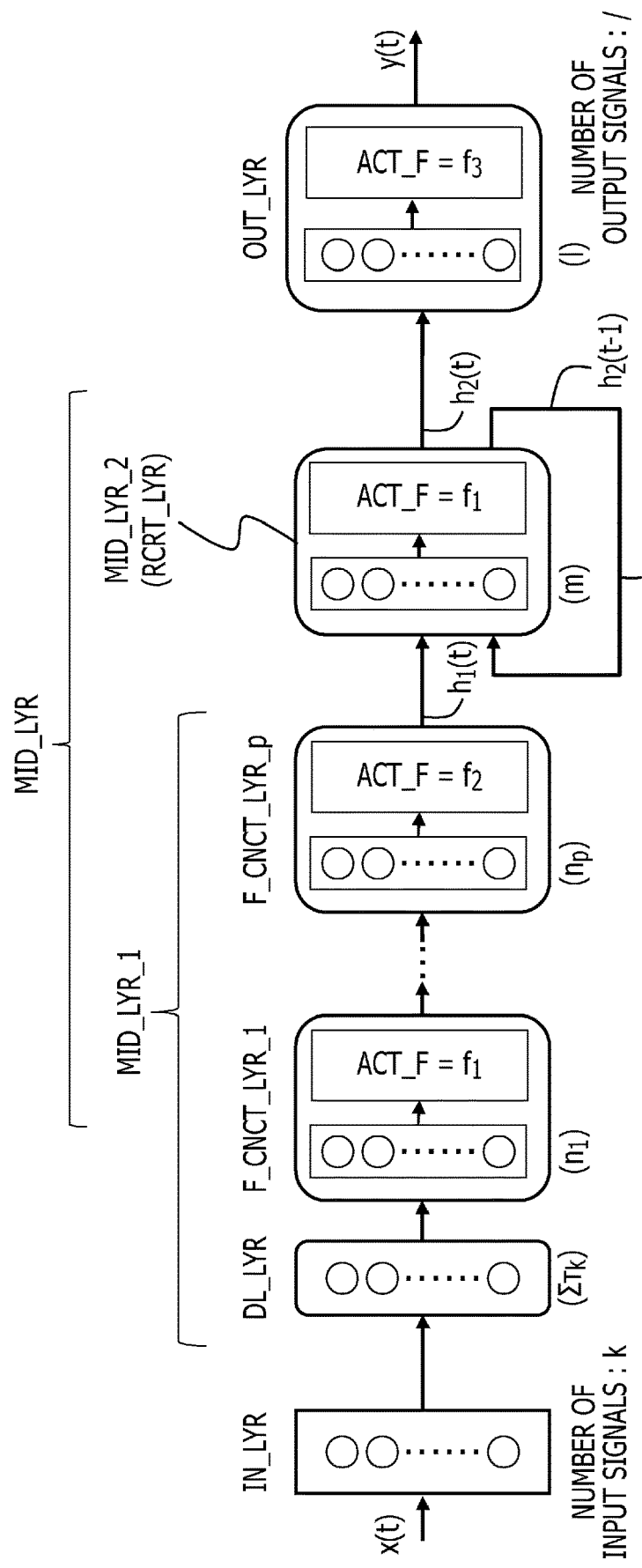
FIG. 9 is a view illustrating an example configuration of a neural network according to a second embodiment.

FIG. 9 is a view illustrating an example configuration of a neural network according to a second embodiment. The neural network of FIG. 9, similarly to the first embodiment illustrated in FIG. 6, includes the input layer IN_LYR to which the input data x(t) are input, the output layer OUT_LYR from which the output data y(t) are output, and the hidden layers MID_LYR between the input layer and the output layer. Further, the hidden layers MID_LYR include the first hidden layer MID_LYR_1 including the delay layer DL_LYR and the fully connected layer F_CNCT_LYR, and the second hidden layer MID_LYR_2 including the layer RCRT_LYR having the return path.

In contrast to the first embodiment, however, the first hidden layer MID_LYR_1 includes a plurality of fully connected layers F_CNCT_1 to F_CNCT_p. Of the plurality of fully connected layers, the activation function ACT_F of the fully connected layers F_CNCT_1 to F_CNCT_p−1 other than the final layer F_CNCT_LYR is the hyperbolic tangent function $f_1$, while the activation function ACT_F of the final fully connected layers F_CNCT_p is the rectified linear unit (ReLU) $f_2$. It is sufficient that at least the final layer of the plurality of fully connected layers uses the ReLU function, but ReLU may also be used as the activation function of the fully connected layers other than the final layer.

Figure 10:
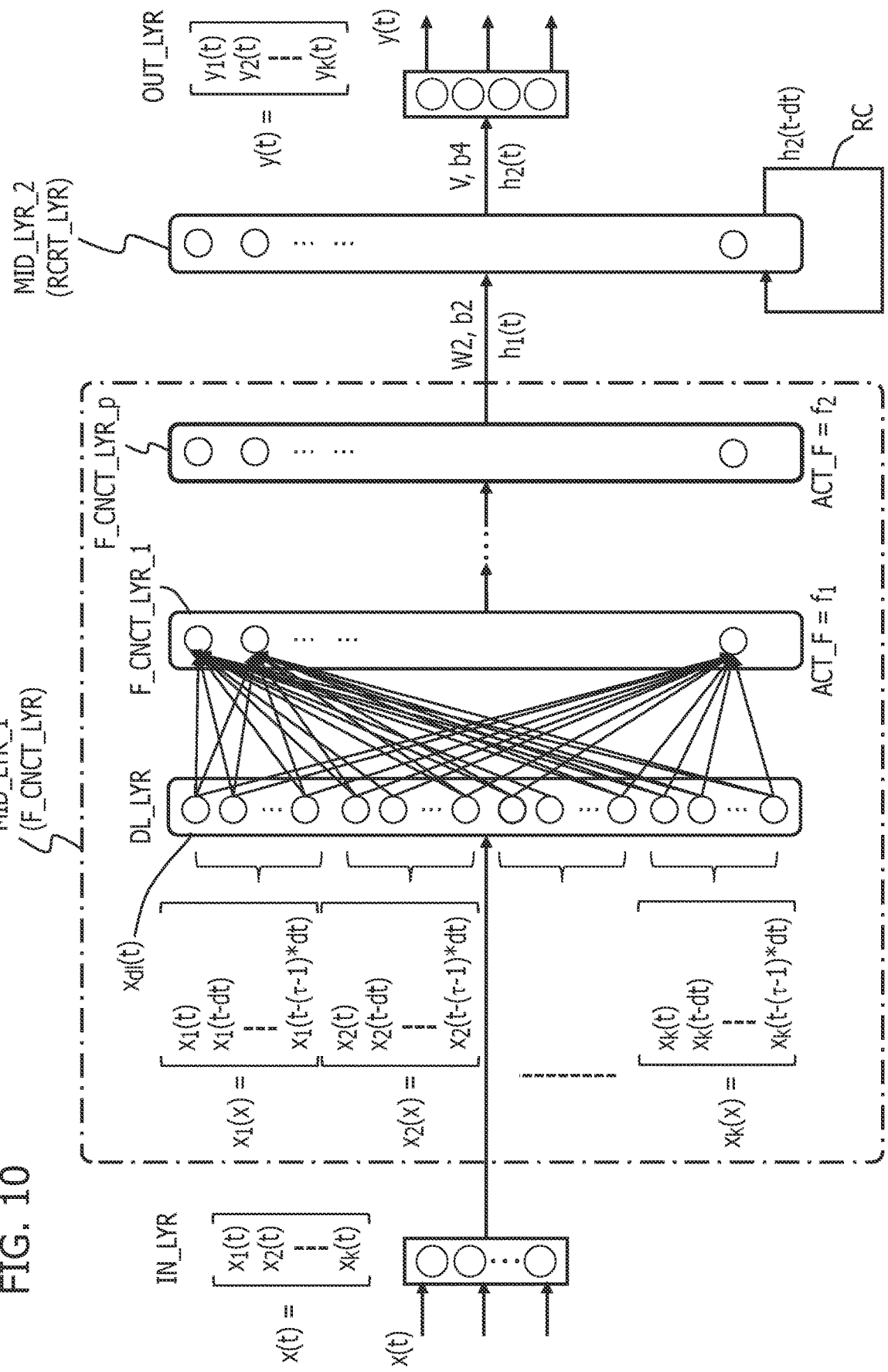
FIG. 10 is a view illustrating in detail the configurations of the delay layer DL_LYR and the fully connected layer F_CNCT_LYR within the first hidden layer MID_LYR_1 of the neural network of FIG. 9.

On FIGS. 9 and 10, the numbers of neurons on the respective layers are indicated in parentheses.

As described above, on the neural network of the second embodiment, the plurality of fully connected layers F_CNCT_1 to F_CNCT_p are provided between the input layer IN_LYR and the layer RCRT_LYR having the return path. Thus, the plurality of fully connected layers appropriately extract the feature of the input data, which are constituted by time series data, and the data at or below 0 are all converted to 0 by the activation function ReLU of the final layer of the plurality of fully connected layers. As a result, useful information having a feature compressed into a lower order is output to the layer having the return path.

FIG. 10 is a view illustrating in detail the configurations of the delay layer DL_LYR and the fully connected layer F_CNCT_LYR within the first hidden layer MID_LYR_1 of the neural network of FIG. 9. In contrast to the first embodiment, illustrated in FIG. 7, the first hidden layer MID_LYR_1 includes the plurality of fully connected layers F_CNCT_1 to F_CNCT_p. Apart from the plurality of fully connected layers F_CNCT_1 to F_CNCT_p, the delay layer DL_LYR within the first hidden layer MID_LYR_1, the layer RCRT_LYR having the return path within the second hidden layer MID_LYR_2, and the output layer OUT_LYR are identical to FIG. 7.

In the second embodiment, the processor executes the operations illustrated in FIG. 8.

Third Embodiment

Figure 11:
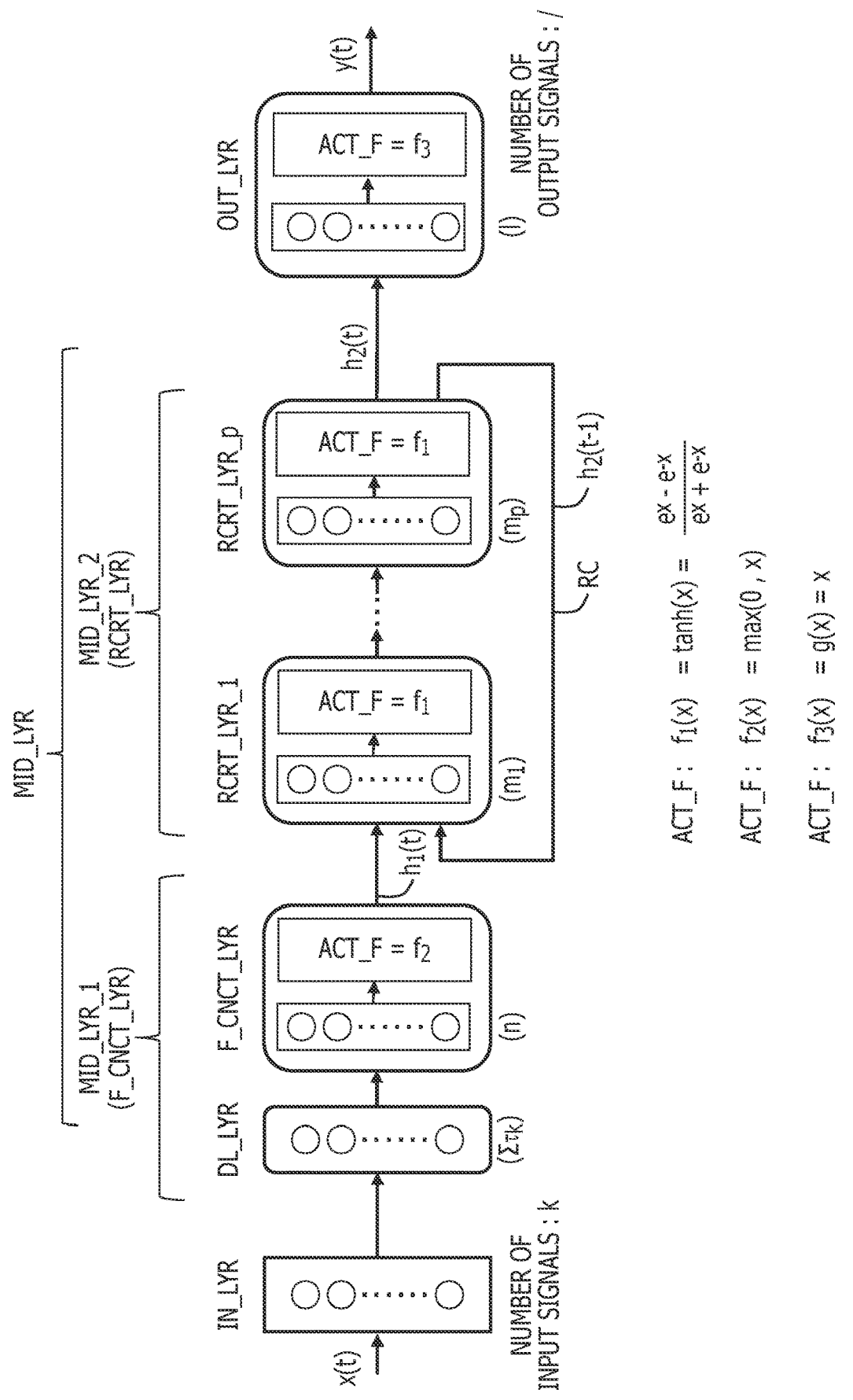
FIG. 11 is a view illustrating an example configuration of a neural network according to a third embodiment.

FIG. 11 is a view illustrating an example configuration of a neural network according to a third embodiment. This neural network, similarly to the neural networks of the first and second embodiments, includes the input layer IN_LYR to which the input data x(t) are input, the output layer OUT_LYR from which the output data y(t) are output, and the hidden layers MID_LYR between the input layer and the output layer. Further, the hidden layers MID_LYR include the first hidden layer MID_LYR_1 including the delay layer DL_LYR and the fully connected layer F_CNCT_LYR, and the second hidden layer MID_LYR_2 including the layer RCRT_LYR having the return path.

In contrast to the first and second embodiments, however, the second hidden layer MID_LYR_2 includes a plurality of layers RCRT_1 to RCRT_p having a return path, each of which is constituted by a fully connected layer. The output $h_2(t-1)$ of the final layer RCRT_p of the plurality of layers RCRT_1 to RCRT_p having the return path is input into the input of the starting layer RCRT_1 along the return path RC. The activation function ACT_F of the plurality of layers RCRT_1 to RCRT_p having the return path is the hyperbolic tangent function $f_1$, for example. Apart from having the return path RC between the final layer and the starting layer, the plurality of layers RCRT_1 to RCRT_p having the return path are similar to the fully connected layer of FIG. 5 in that each includes a first layer L1 and a second layer L2. In the third embodiment, the processor executes the operations illustrated in FIG. 8.

Fourth Embodiment

Figure 12:
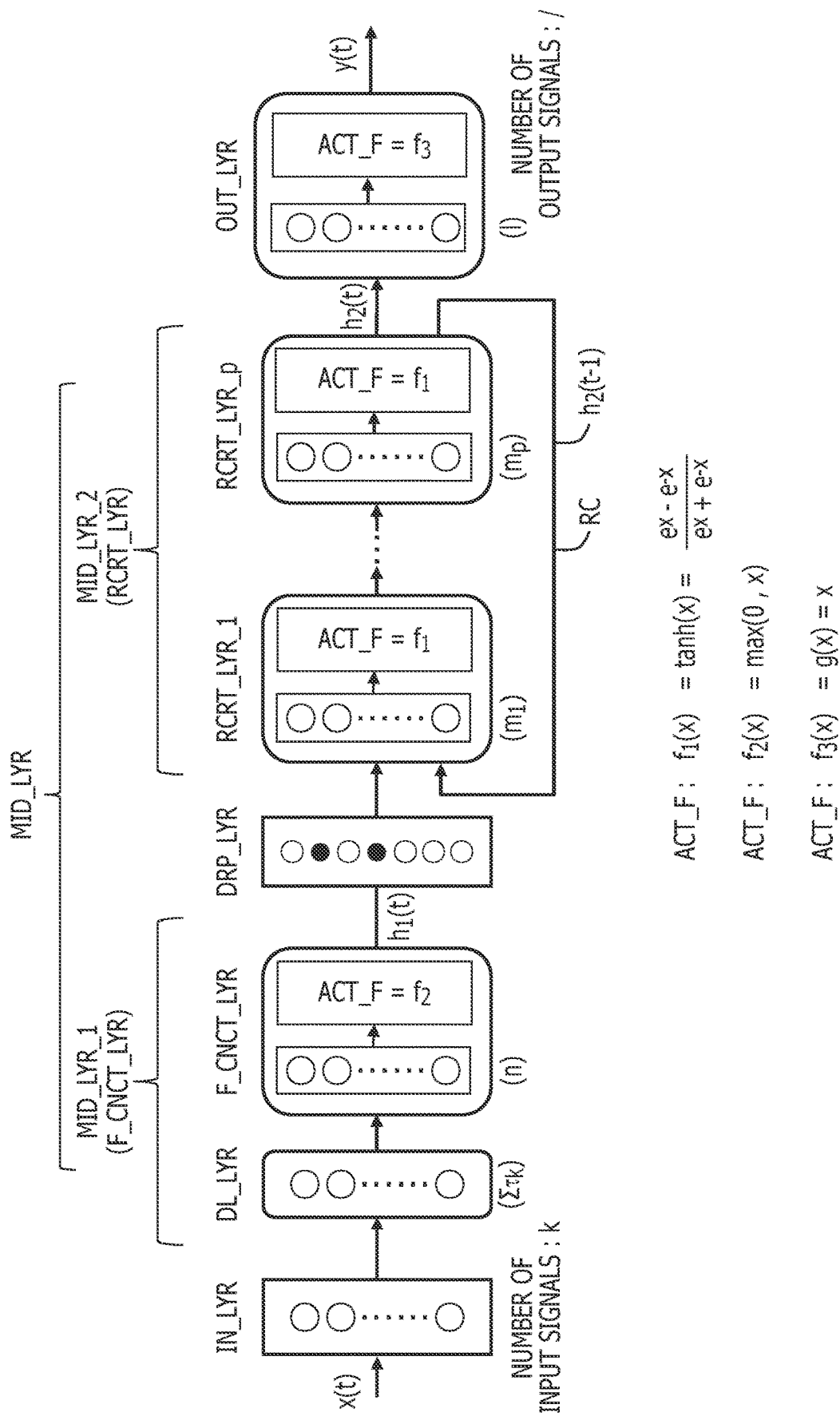
FIG. 12 is a view illustrating an example configuration of a neural network according to a fourth embodiment.

FIG. 12 is a view illustrating an example configuration of a neural network according to a fourth embodiment. The neural network illustrated in FIG. 12, similarly to the third embodiment illustrated in FIG. 11, includes the input layer IN_LYR to which the input data x(t) are input, the output layer OUT_LYR from which the output data y(t) are output, and the hidden layers MID_LYR between the input layer and the output layer. Further, the hidden layers MID_LYR include the first hidden layer MID_LYR_1 including the delay layer DL_LYR and the fully connected layer F_CNCT_LYR, and the second hidden layer MID_LYR_2 including a plurality of layers RCRT_LYR having a return path.

In contrast to FIG. 11, however, a dropout layer DRP_LYR is provided between the first hidden layer MID_LYR_1 and the second hidden layer MID_LYR_2. The dropout ratio of the dropout layer is 0.01% to 50%, for example, and more preferably 1% to 50%.

During the learning process, the processor selects a predetermined proportion of the plurality of neurons in the dropout layer at random, disables the unselected neurons (the black circles in the figure), and performs parameter update processing using a neural network constituted by the selected neurons (the white circles in the figure). In other words, operations are performed as if the disabled neurons did not exist. The processor performs this selection either in minibatches or every time the update processing is performed, thereby modifying the disabled neurons. The dropout ratio is the ratio of disabled neurons.

In the inference process, the processor performs operations after enabling all of the neurons in the dropout layer.

In the fourth embodiment, the processor executes the operations illustrated in FIG. 8. Note, however, that during the operations performed on the neurons in the dropout layer, the neurons are disabled at random, as described above.

By providing the dropout layer, the number of neurons used during learning can be limited, thereby forcibly reducing the degree of freedom of the neural network so as to avoid overlearning, and as a result, the generalization performance is improved. Further, by disabling the neurons at random, learning is substantially performed by each of a plurality of neural networks so that during inference, an identical effect to that obtained by averaging the operation results of a plurality of neural networks is achieved, and as a result, equivalent effects to those obtained by ensemble learning are thought to be achieved. Accordingly, an improvement in the inference precision can be expected.

Fifth Embodiment

Figure 13:
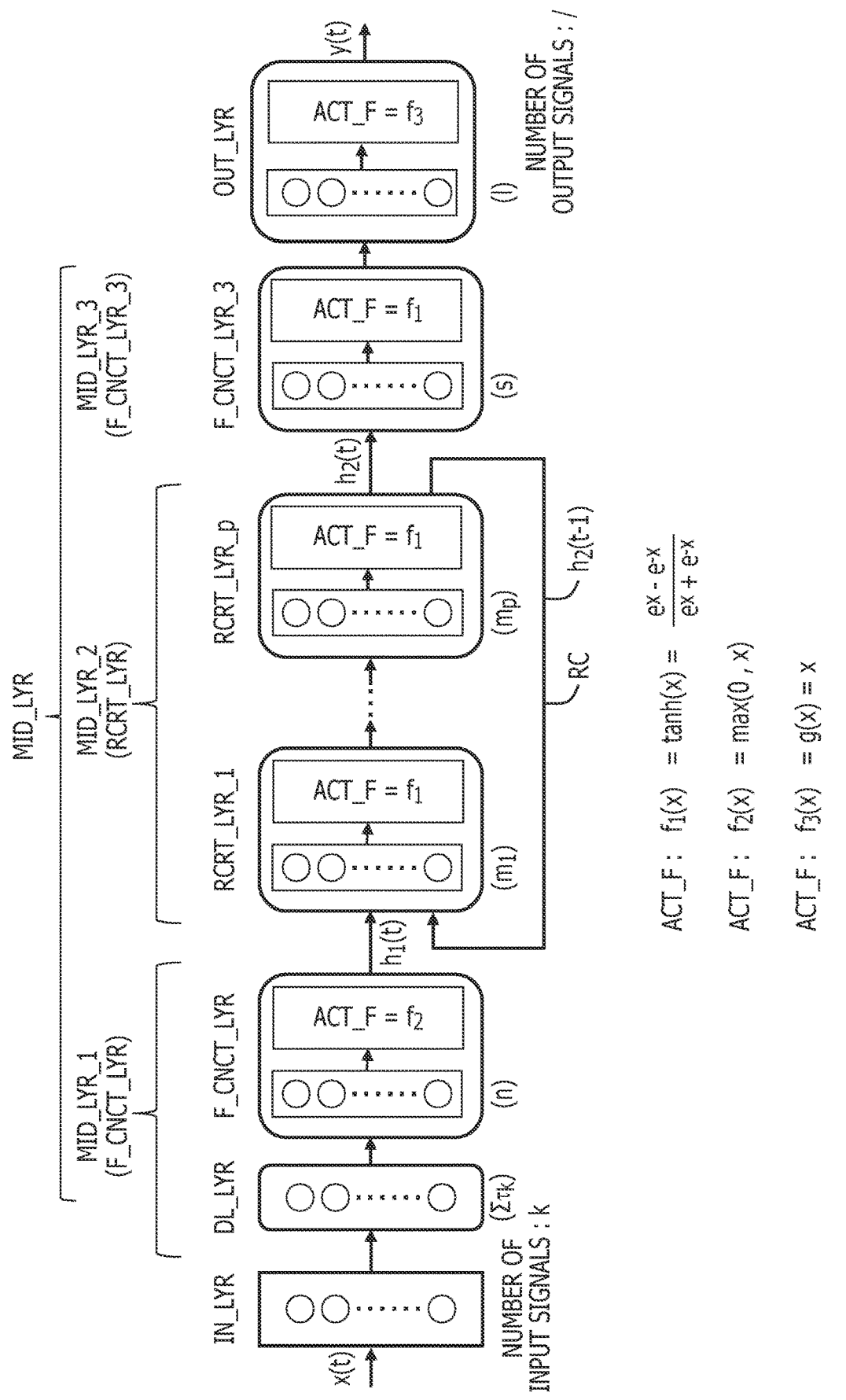
FIG. 13 is a view illustrating an example configuration of a neural network according to a fifth embodiment.

FIG. 13 is a view illustrating an example configuration of a neural network according to a fifth embodiment. On the neural network illustrated in FIG. 13, in contrast to the second embodiment illustrated in FIG. 9, one or a plurality of third hidden layers MID_LYR_3, each including a fully connected layer F_CNCT_LYR_3, are provided between the second hidden layer MID_LYR_2 and the output layer OUT_LYR. In all other respects, FIG. 13 is identical to FIG. 9.

The activation function ACT_F of the added fully connected layer F_CNCT_LYR_3 is the hyperbolic tangent function $f_1$, for example. By providing the fully connected layer F_CNCT_LYR_3 between the second hidden layer MID_LYR_2, which includes the layer having the return path, and the output layer OUT_LYR, a feature is extracted from the output data of the layer having the return path, and therefore an improvement in the inference precision can be expected. In the fifth embodiment, the processor executes the operations illustrated in FIG. 8.

Training Data

During learning in the engine model realized by the neural network, at least one of or both of a chirp signal capable of continuously varying a frequency component and an amplitude pseudo-random bit sequence (APRBS) signal obtained by randomly combining amplitudes of rectangular waves, for example, are used as the training data.

As described above, the time series data of the input signals are constituted by one manipulated variable among the high-pressure EGR opening, the low-pressure EGR opening, the throttle opening, and the turbine vane opening, and actual measurement values (when measurement is possible), sensor values from a software sensor, or set values are used as the time series data. The time series data of the input signals may also include the aforementioned data relating to the internal state of the engine and the environment on the exterior of the engine. Likewise with regard to these input signals, actual measurement values (when measurement is possible), sensor values from a software sensor, or set values are used.

Further, outputs of a fresh air amount sensor, an intake air pressure sensor, and a NOx sensor of an actual engine, or outputs of corresponding software sensors, are used as the time series data of the output signal that is the controlled variable.

Figure 14:
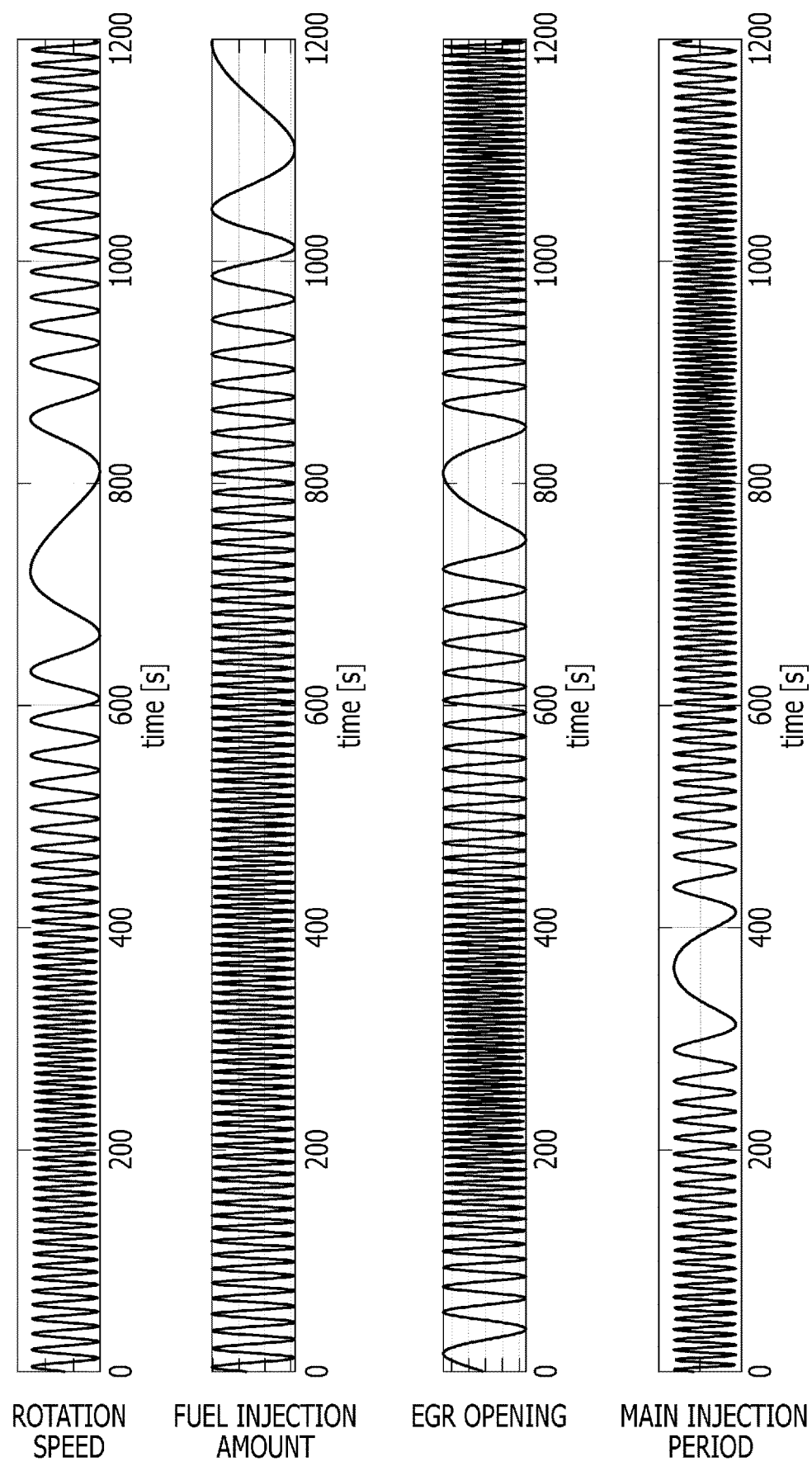
FIG. 14 is a view illustrating examples of chirp signals.

FIG. 14 is a view illustrating examples of chirp signals. FIG. 14 illustrates examples of chirp signals for an engine rotation speed, a fuel injection amount, the EGR opening, and a main injection period. All of the signals have varying frequency components.

Figure 15:
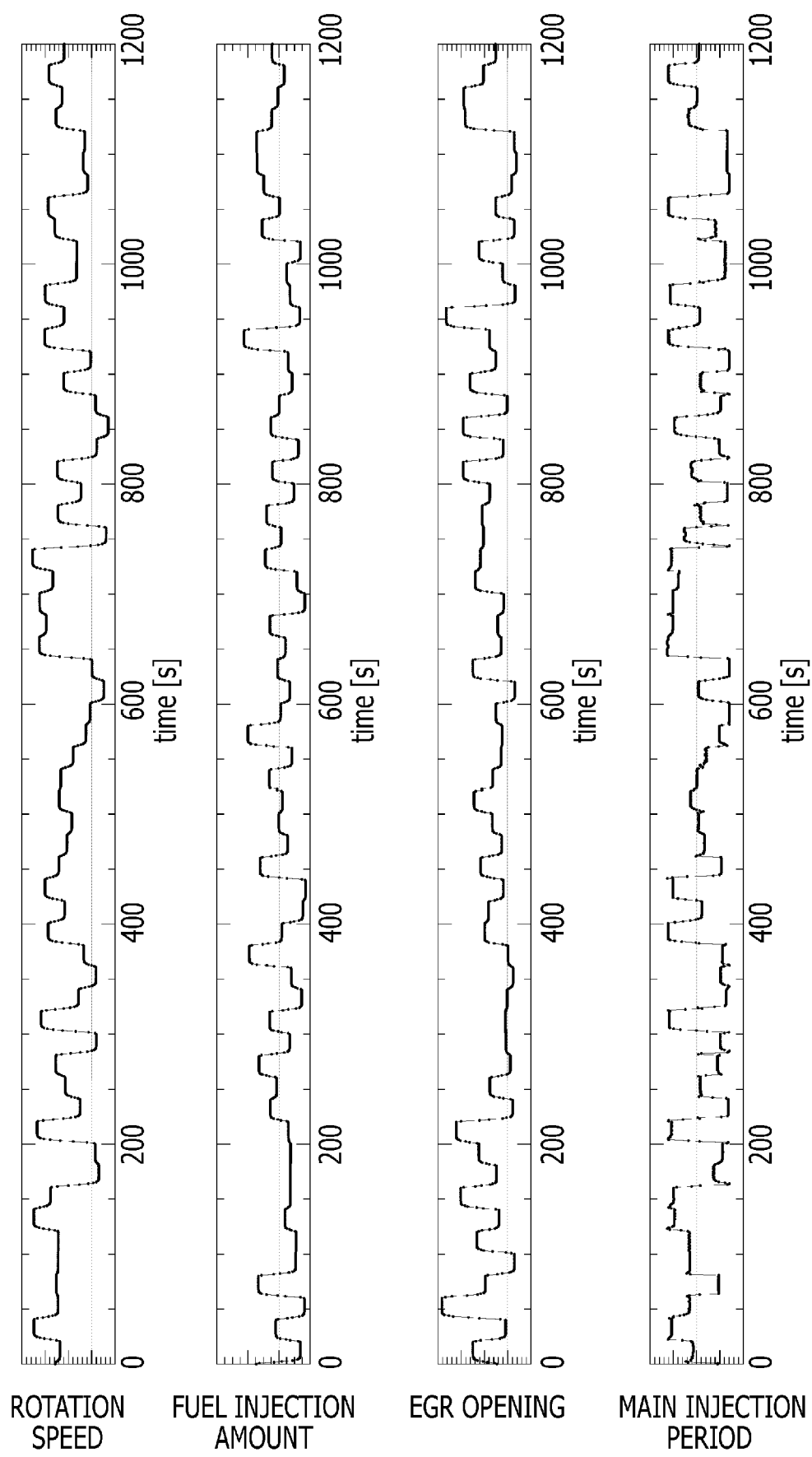
FIG. 15 is a view illustrating examples of APRBS signals.

FIG. 15 is a view illustrating examples of APRBS signals. Similarly to the chirp signals, FIG. 15 illustrates examples of APRBS signals for the engine rotation speed, the fuel injection amount, the EGR opening, and the main injection period. As depicted on the figure, each APRBS signal has a rectangular waveform with a pseudo-randomly varying amplitude.

During learning in the engine model realized by the neural network, a process in which learning is performed using training data of the chirp signals and a process in which learning is performed using training data of the APRBS signals are either performed alternately or switched appropriately, for example.

EXAMPLE

The present inventors created a specific neural network engine model program, caused a processor to execute the program, and evaluated the precision of the engine model.

First, training data and cross-validation data to be used during learning by the neural network were acquired on an engine test bench used to operate an actual engine. A 3 L water-cooled, in-line 4-cylinder diesel engine was used as the engine. Signals of the training data and the cross-validation data were acquired by (1) applying operating conditions created from chirp signals and operating conditions created based on APRBS signals to the rotation speed, the fuel injection amount, the EGR opening, the turbine vane opening, and the main injection period, and (2) operating the engine test bench. Examples of these signals are as illustrated in FIGS. 14 and 15.

From the training data and the cross-validation data acquired as described above, the engine rotation speed, the fuel injection amount, the EGR opening, the turbine vane opening, and the main injection period were used as the input signals that are the manipulated variable MV, and a turbine inlet pressure, a turbine outlet pressure, an intake air temperature, an intake manifold temperature, a cooling water temperature, and an excess air ratio (lambda) were used as the input signals that are the engine state data ENG_DATA, with the result that signals of a total of 11 variables were used as the input signals. Furthermore, from the training data and the cross-validation data, a signal of either the NOx concentration or the fresh air amount was used as the output signal. Thus, a neural network model with 11 inputs and 1 output was constructed.

The evaluated neural network includes two examples, the first example having the configuration illustrated in FIG. 6 and the second example having the configuration illustrated in FIG. 11.

More specifically, in the first example, as illustrated in FIG. 6, the number of neurons on the delay layer DL_LYR is $\tau\tau_k$=55, the number of neurons on the first layer L1 of the fully connected layer F_CNCT_LYR is n=50, the number of neurons on the first layer L1 of the layer RCRT_LYR having the return path is m=10, and the number of neurons on the first layer L1 of the output layer OUT_LYR is l=1. Signals of the aforementioned 11 variables are used as the input signals, and the fresh air amount is used as the output signal. Further, the respective activation functions are as illustrated in FIG. 6. Hence, in comparison with the numbers of neurons (55, 50) on the delay layer and the fully connected layer, the number of neurons on the layer having the return path, i.e. 10, is small.

In a first comparative example corresponding to the first example, the fully connected layer F_CNCT_LYR was omitted from the neural network configuration illustrated in FIG. 6.

In the second example, as illustrated in FIG. 11, the number of neurons on the delay layer DL_LYR is $\tau\tau_k$=55, the number of neurons on the first layer L1 of the fully connected layer F_CNCT_LYR is n=50, the number of neurons on the first layer L1 of the layer RCRT_LYR having the return path extending across two layers is $m_1$, $m_2$=10, and the number of neurons on the first layer L1 of the output layer OUT_LYR is l=1. Signals of the aforementioned 11 variables are used as the input signals, and the NOx concentration is used as the output signal. Further, the respective activation functions are as illustrated in FIG. 11.

In a second comparative example corresponding to the second example, the fully connected layer F_CNCT_LYR was omitted from the neural network configuration illustrated in FIG. 11.

The input signals in the two examples and the two comparative examples include 11 variables, and each variable is constituted by 5-step (5*dt) time series data. Hence, 11×5 sets of data are input into the 55 neurons of the delay layer DL_LYR as the input signals.

Figure 16:
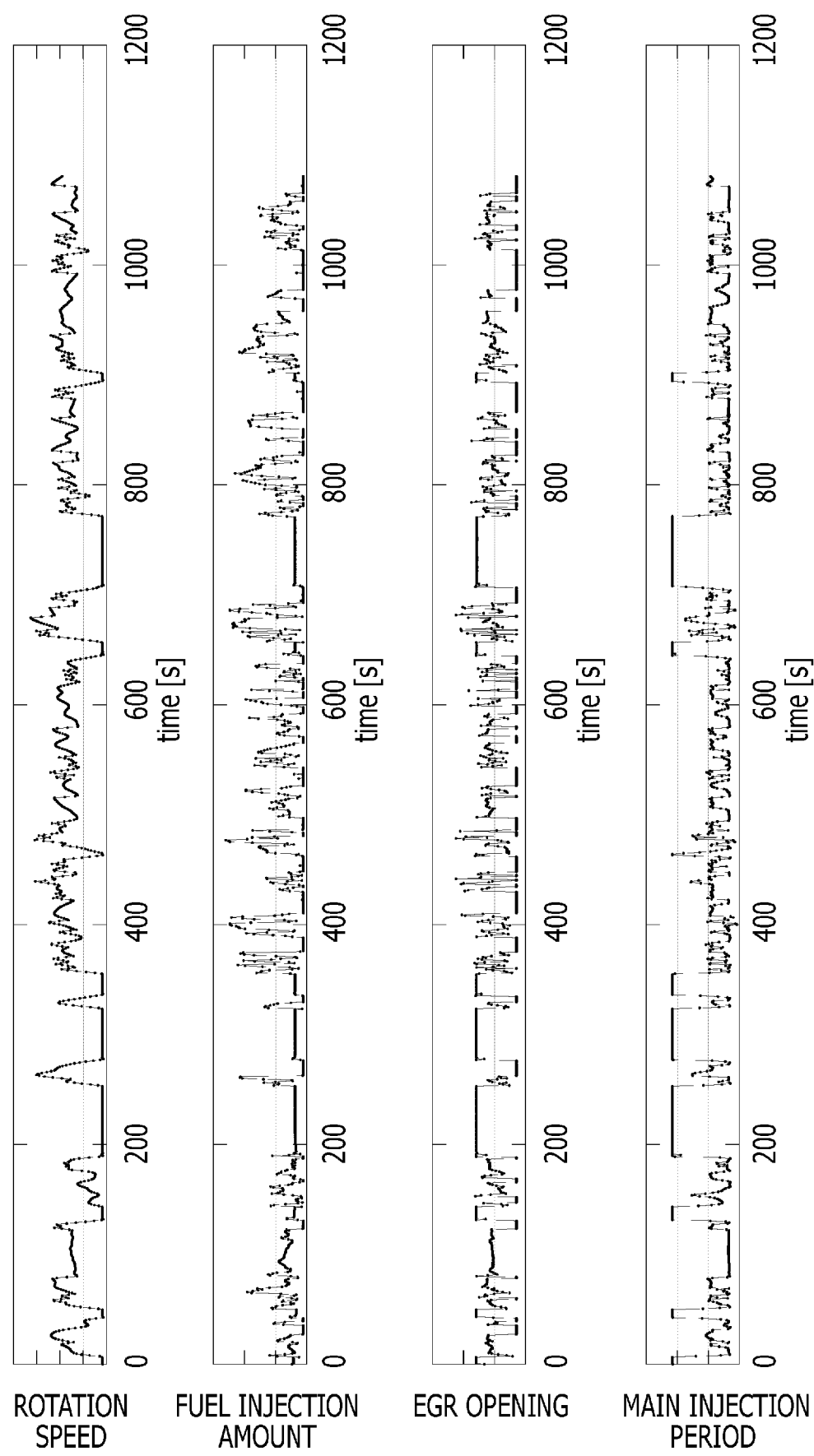
FIG. 16 is a view illustrating examples of signal waveforms in an operating mode of the world harmonizing transient cycle (WHTC).

FIG. 16 is a view illustrating examples of signal waveforms in an operating mode of the world harmonizing transient cycle (WHTC). The chirp signals and APRBS signals used as the input signals of the neural network are generated from the operating mode signal waveforms in FIG. 16. The present inventors implemented cross-validation on the neural networks of the first example and the first comparative example using data acquired in the operating mode of WHTC, and evaluated the neural networks using a determination coefficient $R^2$ and an average squared error RMSE as precision evaluation indices.

During the cross-validation, the acquired training data were divided into four equal parts, for example, whereupon neural network learning was executed using ¾ of the training data, and an evaluation was made using the remaining ¼ of the training data (evaluation data) in order to acquire $R^2$ and RMSE based on the inferred value acquired by the neural network and the correct answer data of the training data. Similar learning and evaluation processes were repeated using modified combinations of the ¾ of the training data and the ¼ of the training data (the evaluation data), and an average evaluation value was determined.

Figure 17:
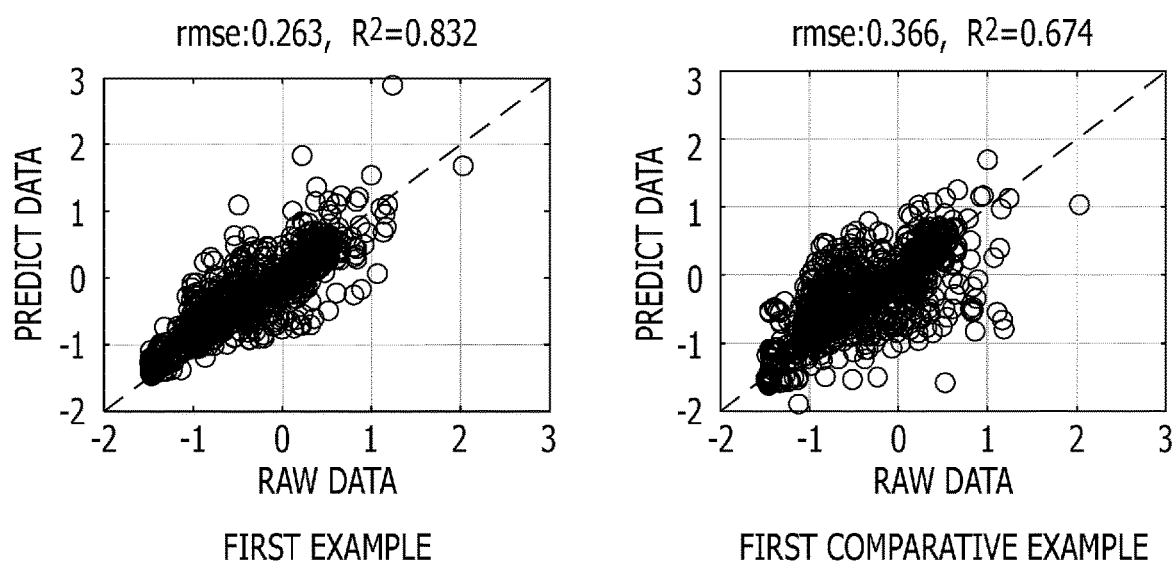
FIG. 17 is a view illustrating the evaluation results of RMSE and R2 in the first example and the first comparative example.

FIG. 17 is a view illustrating the evaluation results of RMSE and $R^2$ in the first example and the first comparative example. The table illustrates that the respective evaluation values and indicates that in the first example, RMSE is smaller and $R^2$ is larger, meaning that the precision is higher. Further, on the graphs depicted in the figure, the horizontal axis represents the correct answer value (actual measurement data) of the training data, and the vertical axis represents the inferred value (the predicted value) computed by the neural network. The graphs illustrate that the inference precision increases steadily as the sample points become more concentrated on a primary straight line of y=x. Accordingly, the graphs in FIG. 17 indicate that the precision is higher in the first example than in the first comparative example.

FIG. 18 is a view illustrating the evaluation results of RMSE and $R^2$ in the second example and the second comparative example. As illustrated on the table, in the second example, RMSE is smaller and $R^2$ is larger, meaning that the precision is higher. Further, the graphs in FIG. 18 indicate that the precision is higher in the second example than in the second comparative example.

According to this embodiment, as described above, on the engine model realized by the neural network, a fully connected layer for extracting a feature of the input data is provided between the input layer and the layer having the return path. With this configuration, the fully connected layer extracts a feature of the input data so that the data output to the layer having the return path are compressed. As a result, the inference precision can be improved without increasing the number of neurons or the number of layers on the layer having the return path, and since the numbers of neurons and layers on the layer having the return path are small, overlearning is suppressed, leading to an improvement in the generalization performance. According to the first aspect of the present embodiment, a reduction in the generalization performance of a model realized by a neural network can be suppressed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An engine control device comprising: an engine model configured by a neural network that is configured to receive a manipulated variable as an input and is configured to compute an estimated controlled variable of the engine corresponding to the manipulated variable;

and a controller configured to compute the manipulated variable so as to reduce a deviation between the estimated controlled variable and a target controlled variable, and outputs the computed manipulated variable to an actuator of the engine, wherein the neural network includes:

an input layer to which a plurality of input data including the manipulated variable are input;

a first hidden layer that includes a first fully connected layer having a plurality of first neurons that respectively generate first sums of products by adding together products of the plurality of input data and respective first weight parameters, and output a plurality of first output values by activating the respective first sums of products based on a first activation function;

a second hidden layer that includes a second fully connected layer having a plurality of second neurons that respectively generate second sums of products by adding together first products of the plurality of first output values acquired at a first time and respective second weight parameters and second products of a plurality of second output values acquired at a second time, which is earlier than the first time, and respective third weight parameters, and output the plurality of second output values acquired at the first time by activating the respective second sums of products based on a second activation function, and also includes a return path on which the plurality of second output values acquired at the second time are input into the second fully connected layer together with the first output values acquired at the first time;

and an output layer from which the plurality of second output values acquired at the first time are output as the estimated controlled variable, wherein the input data including the manipulated variable includes first time series data of any one of a turbine vane opening of a turbocharger of the engine, a valve opening of an exhaust gas recirculation device, and a throttle valve opening for controlling an amount of air supplied to an intake manifold, and the plurality of second output values includes second time series data of any one of an amount of fresh air in the intake manifold of the engine, an intake air pressure in the intake manifold, and an amount of nitrogen oxide contained in exhaust gas.

2. The engine control device according to claim 1, wherein the first activation function of the first hidden layer is a rectified linear unit.

3. The engine control device according to claim 1, wherein the first hidden layer includes a plurality of first fully connected layers, and the first activation function of a final layer of the plurality of first fully connected layers is a rectified linear unit.

4. The engine control device according to claim 1, wherein the second activation function of the second hidden layer is a hyperbolic tangent function.

5. The engine control device according to claim 1, wherein the second hidden layer includes a plurality of second fully connected layers, and the return path is provided between a final layer of the plurality of second fully connected layers and a starting layer of the plurality of second fully connected layers.

6. The engine control device according to claim 1, wherein a dropout layer on which randomly selected neurons are disabled during learning is provided between the first hidden layer and the second hidden layer.

7. The engine control device according to claim 1, wherein a third fully connected layer is provided between the second hidden layer and the output layer, and the third fully connected layer includes at least one fully connected layer.

8. The engine control device according to claim 1, wherein the first time series data are time series data, among time series data acquired by obtaining a signal of the manipulated variable at intervals of a sampling period, extending from a current time to a past time obtained by multiplying a predetermined number of data points by the sampling period.

9. The engine control device according to claim 8, wherein the first time series data are constituted by either a chirp signal having a varying frequency or a rectangular wave signal having a pseudo-randomly varying amplitude.

10. The engine control device according to claim 1, wherein the engine is a diesel engine.

11. A non-transitory computer-readable storage medium storing therein a neural network program for causing a computer to execute processing of inputting a manipulated variable that is input into an actuator of an engine and computing an estimated controlled variable of the engine corresponding to the manipulated variable, the processing of computing the estimated controlled variable comprising:

inputting a plurality of input data including the manipulated variable;

first processing in which a plurality of first neurons in a first fully connected layer included in a first hidden layer respectively generates first sums of products by adding together products of the plurality of input data and respective first weight parameters, and output a plurality of first output values by activating the respective first sums of products based on a first activation function;

and second processing in which a plurality of second neurons in a second fully connected layer respectively generates second sums of products by adding together first products of the plurality of first output values acquired at a first time and respective second weight parameters and second products of a plurality of second output values acquired at a second time, which is earner than the first time, and respective third weight parameters, and computes the plurality of second output values acquired at the first time as the estimated controlled variable by activating the respective second sums of products based on a second activation function, wherein, in the second processing, the plurality of second output values acquired at the second time are input to the second fully connected layer 10 together with the first output values acquired at the first time, the input data including the manipulated variable includes first time series data of any one of a turbine vane opening of a turbocharger of the engine, a valve opening of an exhaust gas recirculation device, and a throttle valve opening for controlling an amount of air supplied to an intake manifold, is and the plurality of second output values includes second time series data of any one of an amount of fresh air in the intake manifold of the engine, an intake air pressure in the intake manifold, and an amount of nitrogen oxide contained in exhaust gas.

* * * * *